(12) United States Patent
Suzuki

(10) Patent No.: US 8,989,039 B2
(45) Date of Patent: Mar. 24, 2015

(54) PACKET TRANSFER DELAY MEASUREMENT SYSTEM

(71) Applicant: Fujitsu Limited, Kawasaki-shi (JP)

(72) Inventor: Yasuhiro Suzuki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 13/685,036

(22) Filed: Nov. 26, 2012

(65) Prior Publication Data

US 2013/0223248 A1    Aug. 29, 2013

(30) Foreign Application Priority Data

Feb. 24, 2012    (JP) ................................. 2012-038605

(51) Int. Cl.
    *H04L 12/26*    (2006.01)
(52) U.S. Cl.
    CPC .................................. *H04L 43/0858* (2013.01)
    USPC ....................................................... 370/252
(58) Field of Classification Search
    CPC .............. H04L 43/106; H04L 43/0852; H04L 43/0858; H04L 43/50; H04L 43/08
    USPC .......................................... 370/241, 250, 252
    See application file for complete search history.

(56) References Cited

U.S. PATENT DOCUMENTS

| 4,569,042 A * | 2/1986 | Larson | 370/250 |
| 7,519,006 B1 * | 4/2009 | Wing | 370/252 |
| 2008/0151771 A1 * | 6/2008 | Dowse | 370/252 |
| 2009/0232016 A1 * | 9/2009 | Pruthi et al. | 370/252 |

FOREIGN PATENT DOCUMENTS

JP    2006-352527    12/2006

* cited by examiner

*Primary Examiner* — Ricky Ngo
*Assistant Examiner* — Kabir Jahangir
(74) *Attorney, Agent, or Firm* — Fujitsu Patent Center

(57) ABSTRACT

When measuring a one-way packet transfer delay between first and second measurement devices in a time-asynchronous manner, the first measurement device transmits first packets each containing a first counter value at a time of transmission; and then transmits a second packet containing a second counter value at the time of the transmission. The second measurement device stores the first counter value extracted from each of the first packets, a third counter value at a time of reception, and reception time stamp information; calculates an incremental ratio between the first counter value and the third counter value per unit time; and calculates an expected fourth counter value at the time of the reception based on the second counter value and the incremental ratio, and obtains the transfer delay based on the calculated expected fourth counter value and an actual fourth counter value at the time of the reception.

8 Claims, 20 Drawing Sheets

FIG. 11

PRE-MEASUREMENT-START PROCESSING NOTIFICATION PACKET PP

| HEADER PART | USER DATA PART | | |
|---|---|---|---|
| | CONTROL CODE Cc | COUNTER VALUE As | NUMBER n OF TIMES OF REPETITION |

CONTROL CODE Cc=PRE-MEASUREMENT-START PROCESSING NOTIFICATION

FIG. 12

POST-MEASUREMENT-START PROCESSING NOTIFICATION PACKET PS

| HEADER PART | USER DATA PART | |
|---|---|---|
| | CONTROL CODE Cc | COUNTER VALUE As |

CONTROL CODE Cc=POST-MEASUREMENT-START PROCESSING NOTIFICATION

FIG. 13

TABLE FOR PRE-MEASUREMENT-START PROCESSING    461

| ITEM | COUNTER VALUE (AT TIME OF TRANSMISSION) As OF FIRST PACKET TRANSFER DELAY MEASUREMENT DEVICE 20 | COUNTER VALUE (AT TIME OF RECEPTION) Br OF SECOND PACKET TRANSFER DELAY MEASUREMENT DEVICE 40 | TIME STAMP INFORMATION (AT TIME OF RECEPTION) Bt OF SECOND PACKET TRANSFER DELAY MEASUREMENT DEVICE 40 |
|---|---|---|---|
| 1 | 350 | 1500 | 10:00:00.000 |
| 2 | 550 | 2400 | 10:00:02.000 |
| 3 | 1342 | 6008 | 10:00:10.000 |
| 4 | 2322 | 10518 | 10:00:20.000 |

FIG. 14

RATIO STORAGE TABLE    463

| RATIO x BETWEEN PROGRESS OF COUNTERS=99:450.7 |
|---|

FIG. 15

TABLE FOR POST-MEASUREMENT-START PROCESSING

| ITEM | COUNTER VALUE (AT TIME OF TRANSMISSION) As OF FIRST PACKET TRANSFER DELAY MEASUREMENT DEVICE 20 | COUNTER VALUE (AT TIME OF RECEPTION) Br OF SECOND PACKET TRANSFER DELAY MEASUREMENT DEVICE 40 |
|---|---|---|
| 10 | 1333 | 6155 |
|  |  |  |

PRE-MEASUREMENT-START PROCESSING REQUEST PACKET PR

| HEADER PART | USER DATA PART | |
|---|---|---|
| | CONTROL CODE Cc | NUMBER n OF TIMES OF REPETITION |

CONTROL CODE Cc=PRE-MEASUREMENT-START PROCESSING REQUEST

FIG. 24

PRE-MEASUREMENT-START PROCESSING RESPONSE PACKET PT

| HEADER PART | USER DATA PART | |
|---|---|---|
| | CONTROL CODE Cc | ACKNOWLEDGMENT/ NEGATIVE-ACKNOWLEDGMENT INFORMATION |

CONTROL CODE Cc=PRE-MEASUREMENT-START PROCESSING RESPONSE

FIG. 25

PRE-MEASUREMENT-START PROCESSING NOTIFICATION PACKET PP

| HEADER PART | USER DATA PART | | |
|---|---|---|---|
| | CONTROL CODE Cc | TRANSFER COUNTER VALUE Ac | COUNTER VALUE As |

CONTROL CODE Cc=PRE-MEASUREMENT-START PROCESSING NOTIFICATION

FIG. 26

POST-MEASUREMENT-START PROCESSING NOTIFICATION PACKET PS

| HEADER PART | USER DATA PART | |
|---|---|---|
| | CONTROL CODE Cc | COUNTER VALUE As |

CONTROL CODE Cc=POST-MEASUREMENT-START PROCESSING NOTIFICATION

FIG. 27

TRANSFER COUNTER VALUE TABLE 281

| COUNTER VALUE (AT TIME OF TRANSMISSION) As OF FIRST PACKET TRANSFER DELAY MEASUREMENT DEVICE 20 | COUNTER VALUE (AT TIME OF RECEPTION) Ar OF FIRST PACKET TRANSFER DELAY MEASUREMENT DEVICE 20 | TRANSFER COUNTER VALUE Ac OF FIRST PACKET TRANSFER DELAY MEASUREMENT DEVICE 20 |
|---|---|---|
| 100 | 200 | 50 |

FIG. 28

TRANSFER COUNTER VALUE TABLE 464

| TRANSFER COUNTER VALUE Ac |
|---|

PACKET TRANSFER DELAY MEASUREMENT SYSTEM

CROSS-REFERENCE TO RELATED APPLICATION

The disclosure of Japanese Patent Application No. JP2012-038605 filed on Feb. 24, 2012 including the specification, claims, drawings and abstract is incorporated herein by reference in its entirety.

FIELD

The disclosures made herein relate to a packet transfer delay measurement system.

BACKGROUND

In a communication system that causes client-client communications and server-client communications to be performed through an internet protocol (IP) communication network such as the Internet or an intranet, a plurality of network component devices having packet processing functions such as a router, a switch, and an exchange are disposed in order to transfer target data to be transmitted in a packet format.

In such a communication system, it is necessary to handle an end-to-end packet transfer delay by performing periodical measurement thereof in order to maintain quality of service, the end-to-end packet transfer delay including a processing delay within the network component device and a transmission line (propagation) delay within a communication network.

The following is a related art to the invention.

[Patent document 1] Japanese Patent Laid-Open Publication No. JP 2006-352527

SUMMARY

FIG. 1 exemplifies a system configuration that employs a first method for measuring the packet transfer delay.

In a packet transfer delay measurement system 1A, a measurement device 3 is disposed so as to be opposed to a subject device 2 existing in the communication network. The measurement device 3 transmits a packet for measurement to the subject device 2 through a network line (approaching route).

The packet for measurement looped back by the subject device 2 is received by the measurement device 3 through the network line (returning route). The measurement device 3 measures a time for the packet transfer delay (round-trip delay time) based on a packet transfer time estimated (calculated) in advance and a transmission time stamp and a reception time stamp of the packet for measurement.

In this case, the subject device 2 is, for example, a router as a network relay device existing in the communication network or a personal computer connected to the communication network.

In the case of measuring the packet transfer delay by the first method, the packet for measurement transmitted from the measurement device 3 needs to be looped back by the subject device 2. Therefore, a subject device configuration incapable of the loopback cannot be used for the measurement. Further, even a subject device configuration capable of the loopback cannot directly measure a unidirectional (one-way) packet transfer delay.

FIG. 2 exemplifies a system configuration that employs a second method for measuring the packet transfer delay. In a packet transfer delay measurement system 1B, the one-way packet transfer delay between a transmission device 4 and a reception device 5 can be directly measured.

In the packet transfer delay measurement system 1B, the time first needs to be synchronized between the transmission device 4 and the reception device 5. The transmission device 4 and the reception device 5 perform a strict time synchronization based on a master time (absolute time) of a network time protocol (NTP) server 6 to have the respective internal clocks match each other.

After performing the time synchronization, when transmitting the packet, the transmission device 4 acquires the time stamp from the internal clock, adds the time stamp to the packet as the transmission time stamp, and transmits the time stamp to the reception device 5. The reception device 5 acquires the time stamp at which the packet is received from the internal clock, and acquires the transmission time stamp from the received packet. The reception device 5 measures the time of the packet transfer delay (one-way delay time) based on the packet transfer time estimated (calculated) in advance, the acquired transmission time stamp, and the acquired reception time stamp.

In the case of measuring the packet transfer delay by the second method, the time needs to be strictly matched between the two internal clocks of the transmission device 4 and the reception device 5, which necessitates the NTP server 6 for performing the time synchronization.

Further, there is a third method of measuring the packet transfer delay by using a system call provided by an operating system (OS) when the transmission time stamp and the reception time stamp are acquired. However, processing time is required to acquire the time stamp from the OS, which unavoidably deteriorates performance of a measurement device when the time of the packet transfer delay is measured in a situation such as an overload test in which millions of packets are transmitted/received every second.

According to an aspect of the disclosures made herein, a packet transfer delay measurement system includes a first measurement device and a second measurement device that are opposed to each other via a communication device existing in a network, for measuring a one-way packet transfer delay between the first measurement device and the second measurement device in a time-asynchronous manner.

The first measurement device includes a unit that generates, at a non-heavy traffic time of the communication device, a predetermined number of first packets each containing a first counter value at a time of transmission obtained by a first counter associated with a first internal clock and transmits the first packets; and a unit that generates a second packet containing a second counter value at the time of the transmission obtained by the first counter with an instruction issued from an external portion as a trigger after the transmission of the first packets and transmits the second packet.

The second measurement device includes a unit that sequentially stores, when each of the first packets transmitted from the first measurement device is received via the communication device, the first counter value extracted from each of the first packets, a third counter value at a time of reception obtained by a second counter associated with a second internal clock, and reception time stamp information in storage unit in association with one another; a unit that calculates an incremental ratio between the first counter value and the third counter value per unit time based on the first counter value, the third counter value, and the reception time stamp information that are stored respectively in the storage unit; and a unit that calculates, when the second packet transmitted from the first measurement device is received via the communication device, an expected fourth counter value at the time of the reception based on the second counter value extracted from the second packet and the incremental ratio, and obtains the one-way packet transfer delay based on the calculated expected fourth counter value and an actual fourth counter value at the time of the reception.

The objects and advantages of the invention will be realized and attained by means of the elements and combinations particularly pointed out in the claims.

BRIEF DESCRIPTION OF THE DRAWINGS

FIG. 11 is a diagram for illustrating a pre-measurement-start processing notification packet;

FIG. 12 is a diagram for illustrating a post-measurement-start processing notification packet;

FIG. 13 is a diagram for illustrating a table for the pre-measurement-start processing;

FIG. 14 is a diagram for illustrating a ratio storage table;

FIG. 15 is a diagram for illustrating a table for the post-measurement-start processing;

FIG. 23 is a diagram for illustrating a pre-measurement-start processing request packet;

FIG. 24 is a diagram for illustrating a pre-measurement-start processing response packet;

FIG. 25 is a diagram for illustrating a pre-measurement-start processing notification packet;

FIG. 26 is a diagram for illustrating a post-measurement-start processing notification packet;

FIG. 27 is a diagram for illustrating a transfer counter value table of the first packet transfer delay measurement device; and FIG. 28 is a diagram for illustrating a transfer counter value table of the second packet transfer delay measurement device.

DESCRIPTION OF EMBODIMENTS

Figure 1:
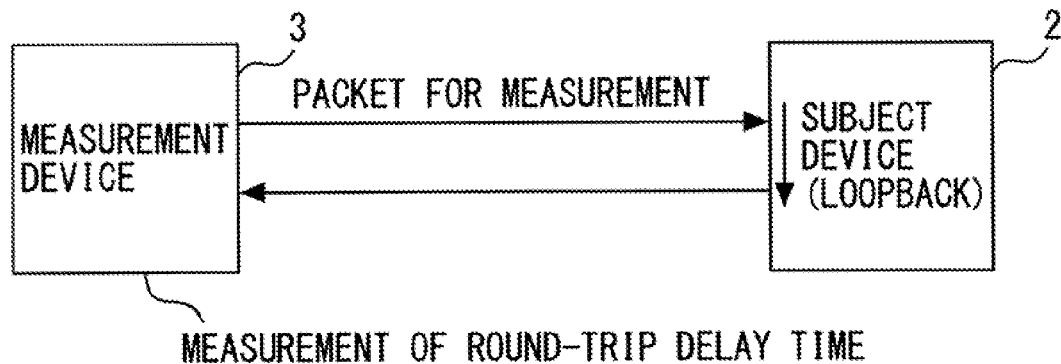
FIG. 1 is a diagram illustrating a system configuration of a related art.
Figure 2:
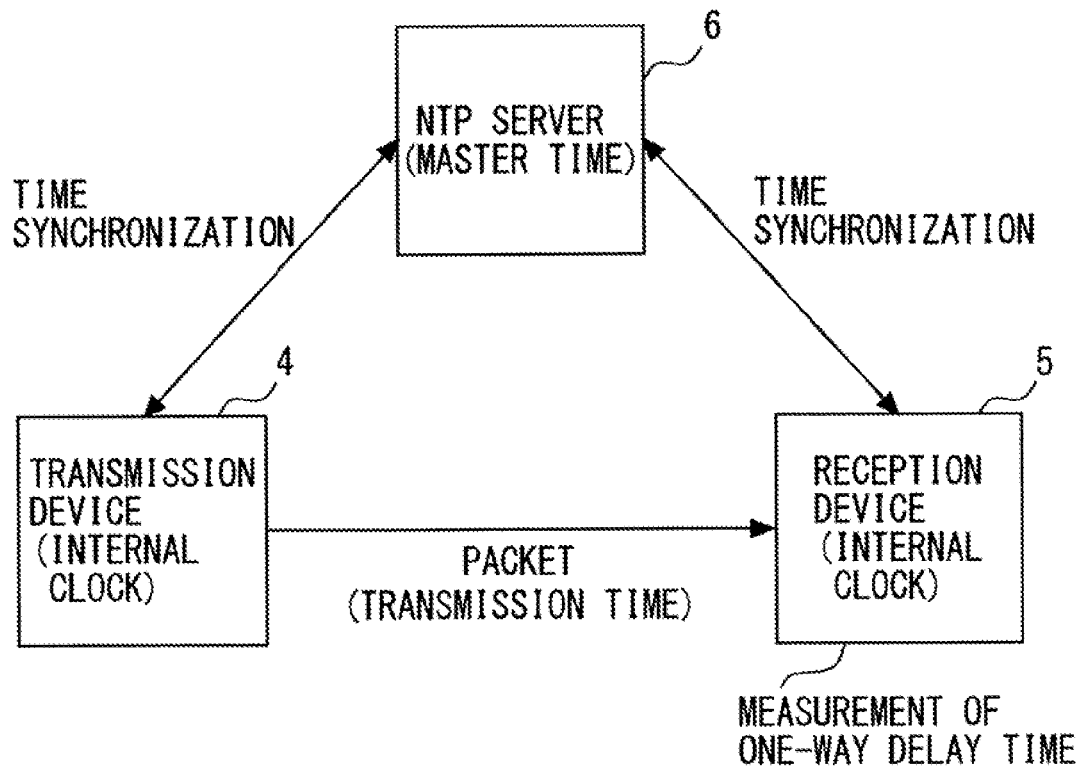
FIG. 2 is a diagram illustrating a system configuration of another related art.

The embodiments of the disclosures made herein will be described below referring to the drawings in detail. The drawings illustrate preferred embodiments. It should be understood, however, that the embodiments can be implemented by many different embodiments, and are not limited to the embodiments described herein.

[First Embodiment]

[Packet Transfer Delay Measurement System]

Figure 3:
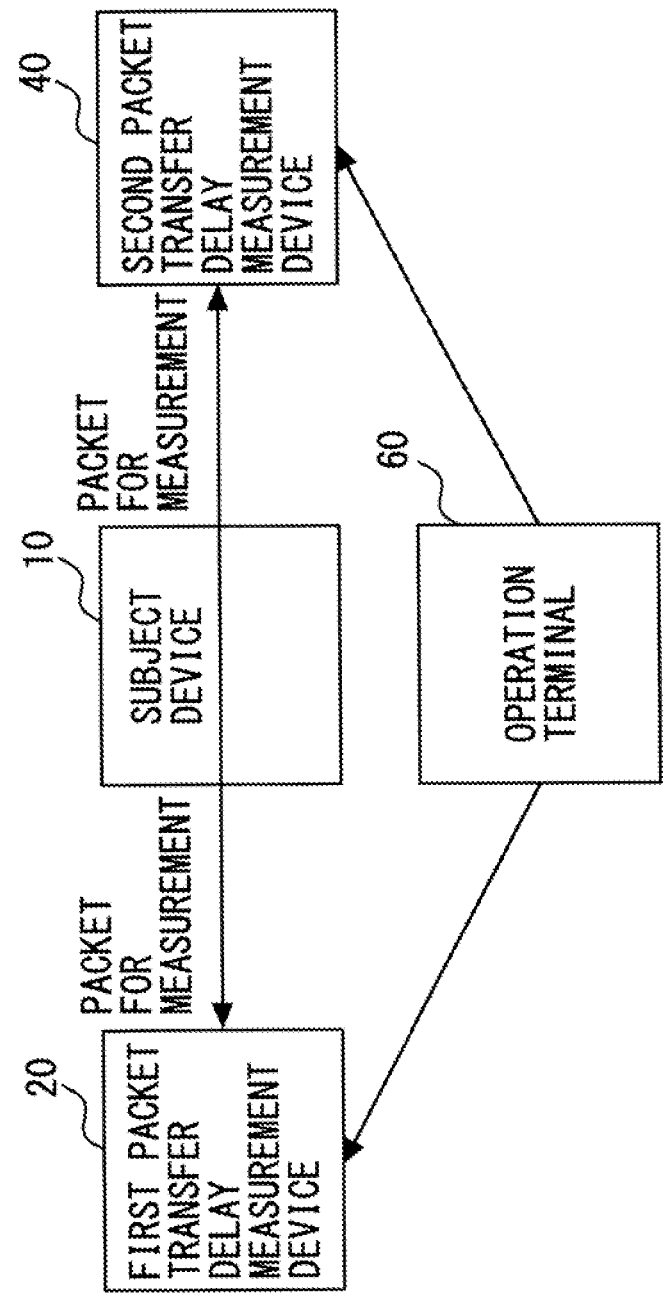
FIG. 3 is a diagram illustrating a system configuration of a first embodiment and a second embodiment of the present invention.

Referring to FIG. 3 illustrating a system configuration of a first embodiment of the present invention, in a packet transfer delay measurement system 1, a first packet transfer delay measurement device 20 and a second packet transfer delay measurement device 40 are disposed so as to be opposed to each other with respect to a subject device 10 subjected to an overload test which exists in a communication network (for example, IP network such as the Internet or intranet).

The subject device 10 subjected to the overload test is, for example, at least one network component device (communication device) which exists in the communication network and has a packet processing function such as a router, a switch, or an exchange. The first packet transfer delay measurement device 20 and the second packet transfer delay measurement device 40 can be located in, for example, a maintenance operations center in order to evaluate performance of both the subject device 10 serving as the network component device and a network line (transmission line) of the communication network.

The packet transfer delay measured in this case is an end-to-end unidirectional (one-way) transfer delay including a processing delay within the subject device 10 and a transmission line (propagation) delay within the communication network. Further, the term "transfer of a packet" includes transmission, exchange, and relay thereof unless particular limitations are required.

In the packet transfer delay measurement system 1, with an execution instruction issued by an operator through an operation terminal 60 within the maintenance operations center as a trigger, the first packet transfer delay measurement device 20 disposed on an input path side toward the subject device 10 transmits a packet for measurement to the second packet transfer delay measurement device 40 disposed on an output path side from the subject device 10 a predetermined multiple number of times. The packet for measurement relayed by the subject device 10 is received by the second packet transfer delay measurement device 40.

The second packet transfer delay measurement device 40 calculates a ratio between progress of counters within the first packet transfer delay measurement device 20 and the second packet transfer delay measurement device 40 before starting measurement of a packet transfer delay, and uses the ratio between the progress of the counters calculated in advance when measuring the packet transfer delay.

By performing this preprocessing before starting the measurement of the packet transfer delay, there is no need to use time stamp information using a system call provided by an operating system (OS) after starting the measurement of the packet transfer delay, and it is possible to measure the packet transfer delay based on a counter value obtained when the packet is transmitted/received and the ratio between the progress of the counters.

[Packet Transfer Delay Measurement Device]

Figure 4:
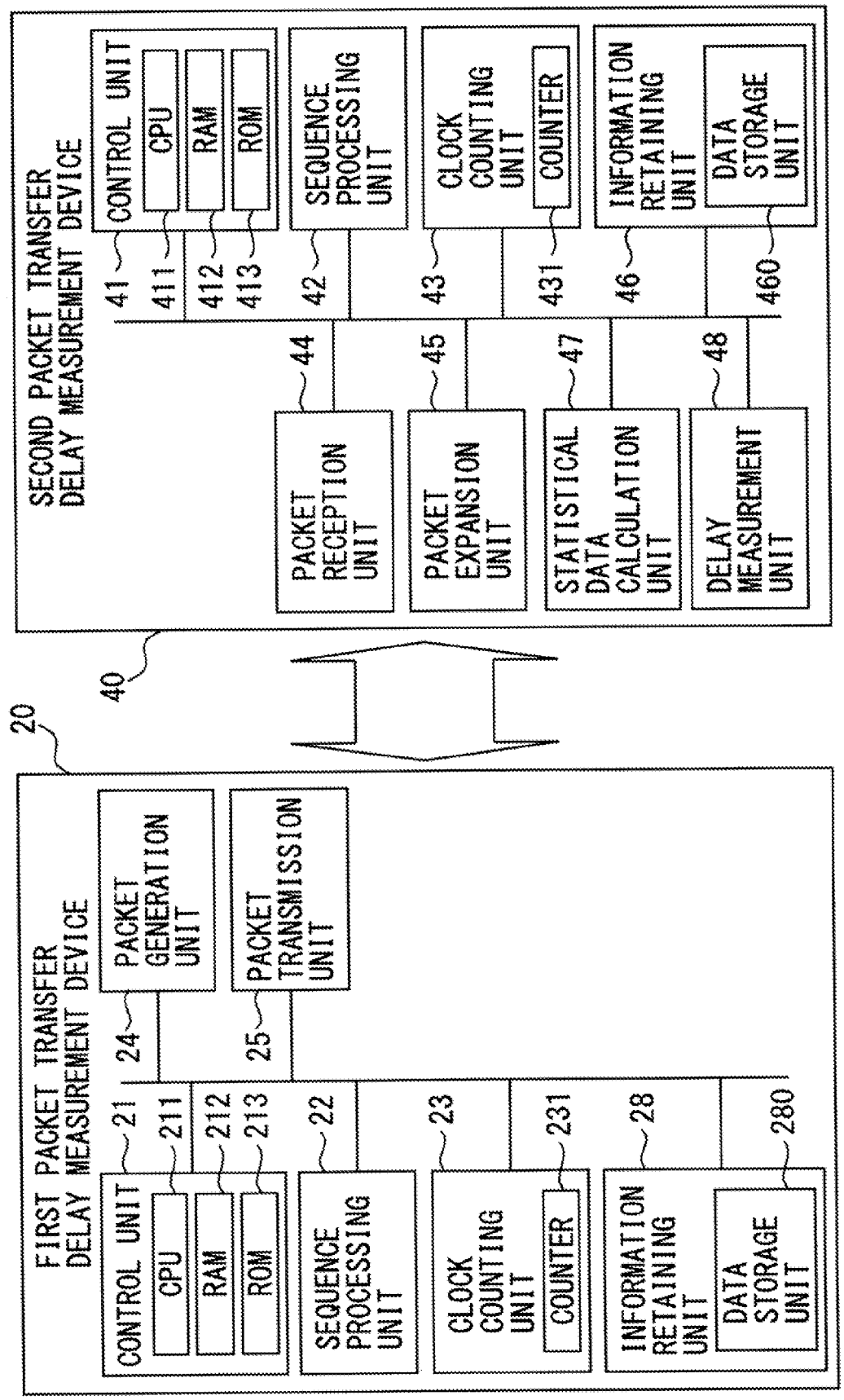
FIG. 4 is a block diagram illustrating configurations of a first packet transfer delay measurement device and a second packet transfer delay measurement device according to the first embodiment of the present invention.

FIG. 4 illustrates an example of detailed configurations of the first packet transfer delay measurement device 20 and the second packet transfer delay measurement device 40 applied to the packet transfer delay measurement system 1 according to the first embodiment illustrated in FIG. 3.

In the first embodiment, the first packet transfer delay measurement device 20 disposed on the input path side toward the subject device 10 is, for example, an information processing device having a packet communication function, and includes a control unit 21, a sequence processing unit 22, a clock counting unit 23, a packet generation unit 24, a packet transmission unit 25, and an information retaining unit 28. Those components can be implemented by a dedicated individual circuit, an arithmetic processing circuit, or the like.

The control unit 21 includes a central processing unit (CPU) 211, a random access memory (RAM) 212 serving as a work memory, and a read only memory (ROM) 213 that stores a boot program for start-up. Further, the information retaining unit 28 is a nonvolatile flash memory, and saves an operating system (OS), various application programs, and various kinds of information (including data) in a rewritable manner.

Further, the second packet transfer delay measurement device 40 disposed on the output path side from the subject device 10 is, for example, an information processing device having a packet communication function, and includes a control unit 41, a sequence processing unit 42, a clock counting unit 43, a packet reception unit 44, a packet expansion unit 45, an information retaining unit 46, a statistical data calculation unit 47, and a delay measurement unit 48. In the same manner, those components can be implemented by a dedicated individual circuit, an arithmetic processing circuit, or the like.

The control unit 41 includes a CPU 411, a RAM 412 serving as a work memory, and a ROM 413 that stores a boot program for start-up. Further, the information retaining unit 46 is a nonvolatile flash memory, and saves an OS, various application programs, and various kinds of information (including data) in a rewritable manner.

To give an outline, the control units 21 and 41 administer main control of the first packet transfer delay measurement device 20 and the second packet transfer delay measurement device 40, respectively. The control unit 21 executes the control with the execution instruction issued by the operator of the operation terminal 60 as a trigger. The sequence processing units 22 and 42 carry out a predetermined sequence (processing procedure) under the control of the control units 21 and 41, respectively.

The clock counting unit 23 and 43 include counters 231 and 431, respectively, for counting (counting up) a signal received from a device internal clock (for example, CPU clock), and generate the counter value. The packet generation unit 24 generates (composes) the packet for measurement to be transmitted to the opposed second packet transfer delay measurement device 40.

The packet transmission unit 25 transmits the generated packet to the opposed second packet transfer delay measurement device 40 via the subject device 10 subjected to the overload test. The packet reception unit 44 receives the packet transmitted from the opposed first packet transfer delay measurement device 20 via the subject device 10 subjected to the overload test. The packet expansion unit 45 decomposes the received packet, and expands (records) necessary contents on a data storage unit 460. The data storage unit 460 includes various tables described later.

The statistical data calculation unit 47 calculates the ratio between the progress of the counters, that is, the incremental ratio between the counter values per unit time, as statistical data in pre-measurement-start processing. The delay measurement unit 48 measures an end-to-end one-way packet transfer delay in post-measurement-start processing.

To logically realize the pre-measurement-start processing and the post-measurement-start processing that are described later in detail, in the first packet transfer delay measurement device 20 and the second packet transfer delay measurement device 40, a control program is installed in the information retaining units 28 and 46 as the application program so that the CPUs 211 and 411 expand the control program in the RAMs 212 and 412, respectively, to execute the control program with the execution instruction issued by the operator of the operation terminal 60 as a trigger.

[Pre-Measurement-Start Processing]

Next, the pre-measurement-start processing for the packet transfer delay is described with reference to FIG. 3, FIG. 4, and the related drawings. Note that, in the process of this processing, descriptions of the communication network existing between the first packet transfer delay measurement device 20 and the second packet transfer delay measurement device 40 and the subject device 10 subjected to the overload test are omitted unless particular limitations are required.

In the processing performed before starting the measurement of the packet transfer delay, a ratio x between the progress of the counters within the first packet transfer delay measurement device 20 and the second packet transfer delay measurement device 40, that is, a ratio (incremental ratio) x between the counter values (count values) indicated by the counters 231 and 431, is calculated at the non-heavy traffic time (including no-load time) of the subject device 10 subjected to the overload test.

Figure 5:
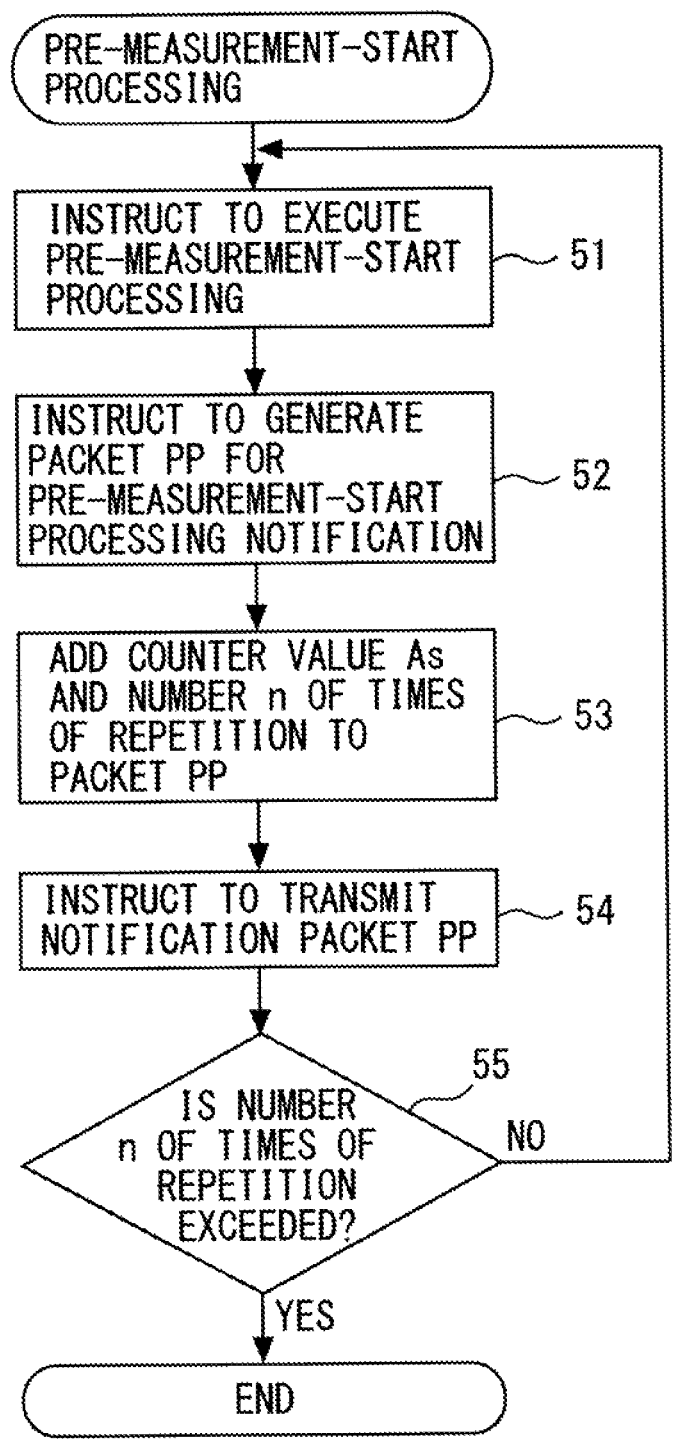
FIG. 5 is a flowchart illustrating pre-measurement-start processing performed by the first packet transfer delay measurement device.

The control unit 21 of the first packet transfer delay measurement device 20 instructs the sequence processing unit 22 to execute the pre-measurement-start processing with the execution instruction issued by the operator through the operation terminal 60 as a trigger (Step 51 of FIG. 5). At this time, the sequence processing unit 22 is also notified of a number n of times of repetition of the pre-measurement-start processing designated by the operator.

The number n of times of the repetition of the pre-measurement-start processing is a number of times that is used for obtaining an average of the ratio x between the progress of the counters, and is an arbitrary numerical value (n≥2) designated by the operator. By increasing the numerical value of the number n of times of the repetition, accuracy of the calculated ratio x between the progress of the counters increases.

The sequence processing unit 22 instructs the packet generation unit 24 to generate a packet in order to transmit a packet PP for the pre-measurement-start processing notification to the second packet transfer delay measurement device 40 (Step 52).

The packet generation unit 24 acquires a counter value As (As=As1) indicated by the counter 231 associated with the device internal clock from the clock counting unit 23, and adds the counter value As to the packet PP along with the number n of times of the repetition of the pre-measurement-start processing (Step 53).

As illustrated as an example in FIG. 11, the packet PP for the pre-measurement-start processing notification generated by the packet generation unit 24 is composed of a header part (IP header part) and a user data part succeeding thereto which contains a control code Cc (Cc=pre-measurement-start processing notification), the counter value As, and the number n of times of the repetition of the pre-measurement-start processing. The number n of times of the repetition corresponds to the number of transmission packets.

Figure 7:
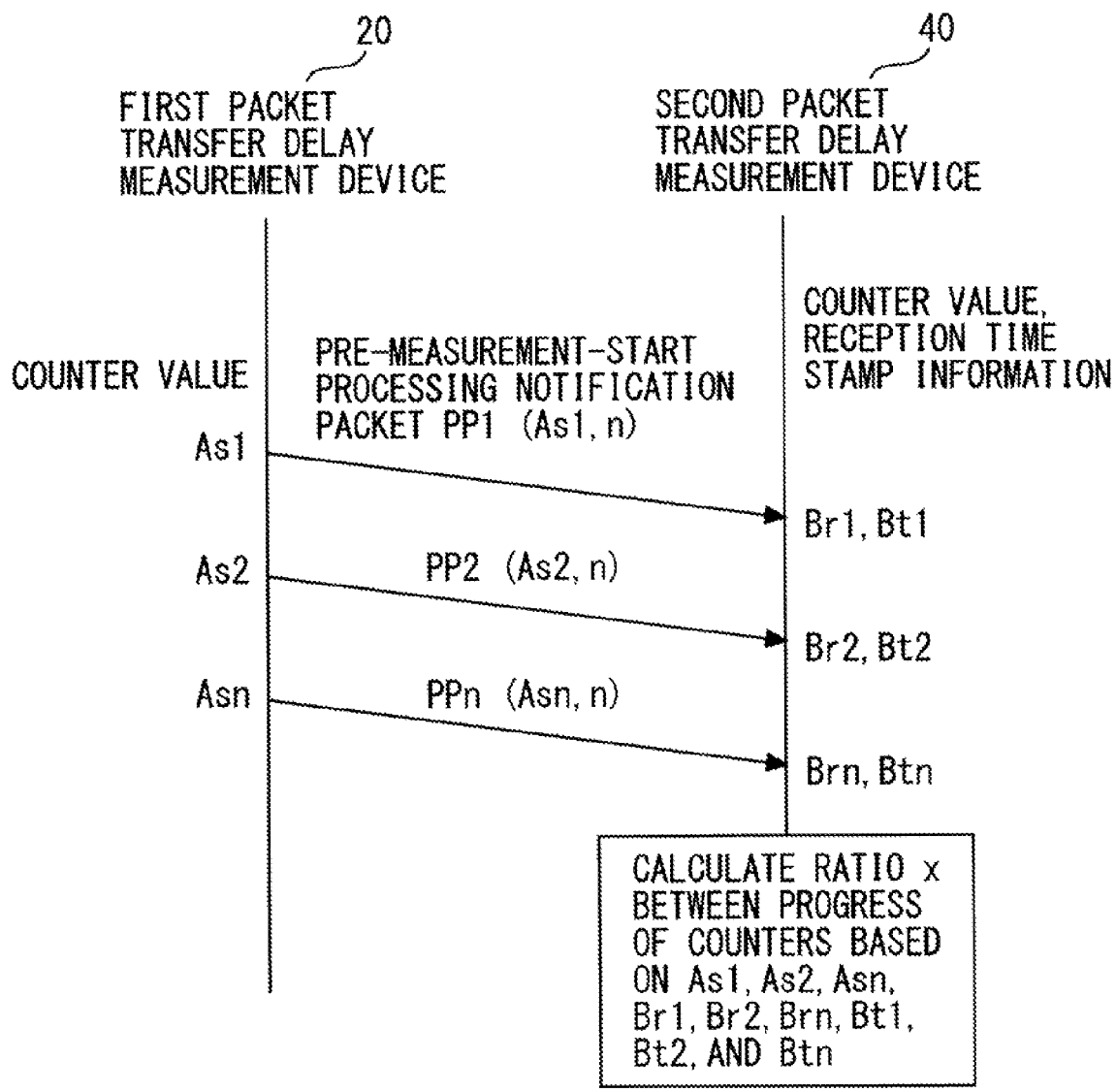
FIG. 7 is a sequence chart of the pre-measurement-start processing.

The sequence processing unit 22 instructs the packet transmission unit 25 to transmit the packet PP (PP1 of FIG. 7) for the pre-measurement-start processing notification generated by the packet generation unit 24 to the second packet transfer delay measurement device 40 (Step 54).

Figure 6:
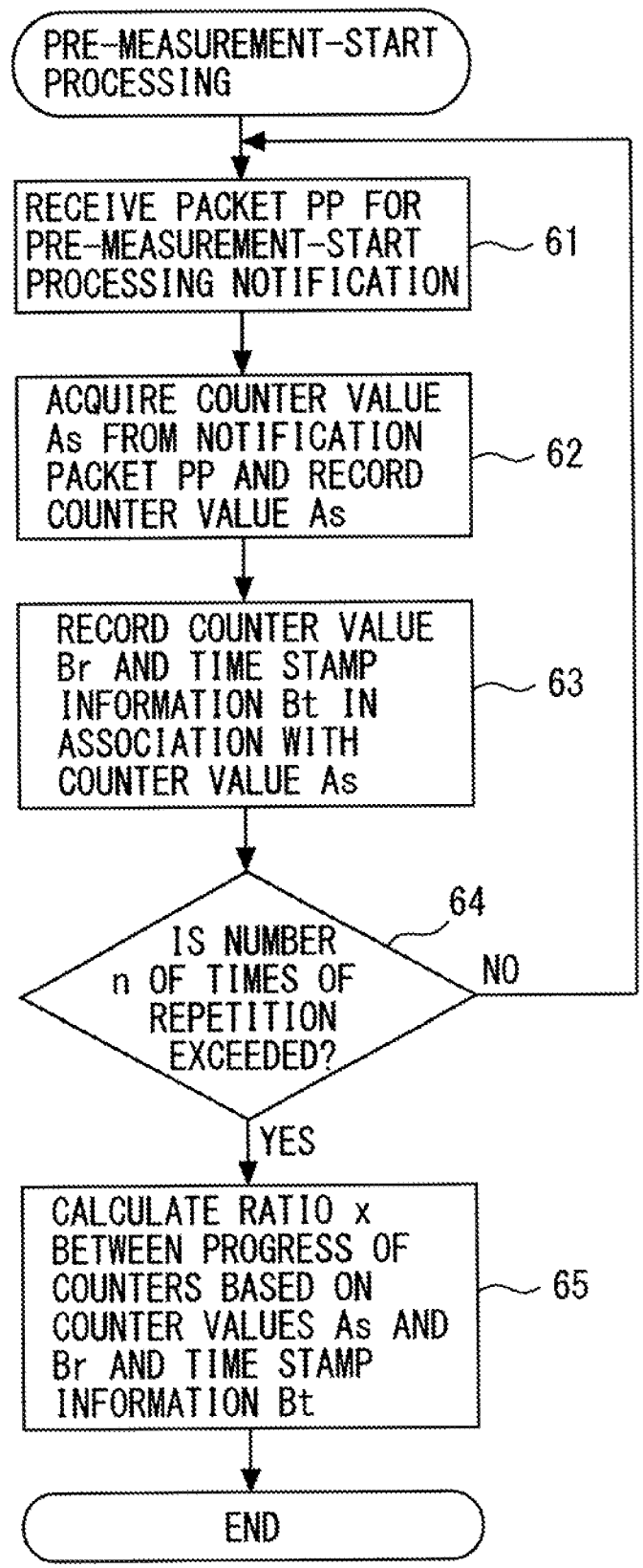
FIG. 6 is a flowchart illustrating pre-measurement-start processing performed by the second packet transfer delay measurement device.

The second packet transfer delay measurement device 40 booted with the execution instruction issued by the operator of the operation terminal 60 as a trigger uses the packet reception unit 44 to receive the packet PP (PP=PP1) for the pre-measurement-start processing notification transmitted from the first packet transfer delay measurement device 20 (Step 61 of FIG. 6).

The packet expansion unit 45 extracts the control code Cc (Cc=pre-measurement-start processing notification) from the packet PP1 received by the packet reception unit 44, and notifies the control unit 41 thereof. Based on the notification, the control unit 41 causes the sequence processing unit 42 to execute the pre-measurement-start processing.

In accordance with an instruction issued by the sequence processing unit 42, the packet expansion unit 45 extracts the counter value As1 from the received packet PP1, and records (stores) the counter value As1 in the data storage unit 460 (Step 62).

At this time, the packet expansion unit 45 acquires a counter value Br (Br=Br1) indicated by the counter 431 associated with the device internal clock from the clock counting unit 43, and records the acquired counter value (at a time of reception of the packet PP1) Br1 in a table 461 for the pre-measurement-start processing of the data storage unit 460 (see FIG. 13) in association with the counter value (at a time of transmission of the packet PP1) As1 (Step 63).

Further, the packet expansion unit 45 acquires time stamp information Bt (Bt=Bt1) at the time of the reception of the packet PP1 from the control unit 41, and records the acquired time stamp information Bt1 in the table 461 for the pre-measurement-start processing in association with the counter value As1 and the counter value Br1 (Step 63). Note that, the time stamp information Bt can be obtained from the control unit 41 that counts time based on, for example, total seconds (cumulative seconds).

The pre-measurement-start processing corresponding to the above-mentioned Steps 52, 53, and 54 and Steps 61, 62, and 63 is repeated the designated number n of times of the repetition (Steps 55 and 64). As a result, the packets PP1, PP2, ..., and PPn for the pre-measurement-start processing notification are transmitted/received between the first packet transfer delay measurement device 20 and the second packet transfer delay measurement device 40 (see FIG. 7).

The statistical data calculation unit 47 of the second packet transfer delay measurement device 40 calculates the ratio x between the progress of the counters within the first packet transfer delay measurement device 20 and the second packet transfer delay measurement device 40 based on the counter values (at the time of the transmission) As1, As2, ..., and Asn, the counter values (at the time of the reception) Br1, Br2, ..., and Brn, and pieces of time stamp information (at the time of the reception) Bt1, Bt2, ..., and Btn which are recorded in the table 461 for the pre-measurement-start processing of the data storage unit 460 (Step 65).

Next, a description is made of the calculation of the ratio x between the progress of the counters, that is, the incremental ratio (in this case, average incremental ratio) between the counter values per unit time by taking specific values acquired respectively in the first packet transfer delay measurement device 20 and the second packet transfer delay measurement device 40 as examples.

As exemplified in FIG. 13, the counter value (at the time of the transmission) As of the first packet transfer delay measurement device 20, the counter value (at the time of the reception) Br of the second packet transfer delay measurement device 40, and the time stamp information (at the time of the reception) Bt of the second packet transfer delay measurement device 40 are recorded in the table 461 for the pre-measurement-start processing in association with one another.

First, the statistical data calculation unit 47 of the second packet transfer delay measurement device 40 calculates the ratio x between the progress of the counters within the first packet transfer delay measurement device 20 and the second packet transfer delay measurement device 40 by using Expression (1) and Expression (2) based on data recorded as a first item and a second item in the table 461 for the pre-measurement-start processing.

$$\text{count per second (unit time) within the first packet transfer delay measurement device } 20 = (As2 - As1)/(Bt2 - Bt1) = (550 - 350)/(10{:}00{:}02.000 - 10{:}00{:}00.000) = 200/2 = 100 \quad \text{Expression (1)}$$

$$\text{count per second within the second packet transfer delay measurement device } 40 = (Br2 - Br1)/(Bt2 - Bt1) = (2{,}400 - 1{,}500)/(10{:}00{:}02.000 - 10{:}00{:}00.000) = 900/2 = 450 \quad \text{Expression (2)}$$

In the same manner, the statistical data calculation unit 47 of the second packet transfer delay measurement device 40 calculates the ratio x between the progress of the counters within the first packet transfer delay measurement device 20 and the second packet transfer delay measurement device 40 by using Expression (3) and Expression (4) based on data recorded as the second item and a third item in the table 461 for the pre-measurement-start processing.

$$\text{count per second within the first packet transfer delay measurement device } 20 = (As3 - As2)/(Bt3 - Bt2) = (1{,}342 - 550)/(10{:}00{:}10.000 - 10{:}00{:}02.000) = 792/8 = 99 \quad \text{Expression (3)}$$

$$\text{count per second within the second packet transfer delay measurement device } 40 = (Br3 - Br2)/(Bt3 - Bt2) = (6{,}008 - 2{,}400)/(10{:}00{:}10.000 - 10{:}00{:}02.000) = 3{,}608/8 = 451 \quad \text{Expression (4)}$$

Further, the statistical data calculation unit 47 of the second packet transfer delay measurement device 40 calculates the ratio x between the progress of the counters within the first packet transfer delay measurement device 20 and the second packet transfer delay measurement device 40 by using Expression (5) and Expression (6) based on data recorded as the third item and a fourth item in the table 461 for the pre-measurement-start processing.

$$\text{count per second within the first packet transfer delay measurement device } 20 = (As4 - As3)/(Bt4 - Bt3) = (2{,}322 - 1{,}342)/(10{:}00{:}20.000 - 10{:}00{:}10.000) = 980/10 = 98 \quad \text{Expression (5)}$$

count per second within the second packet transfer delay measurement device 40=(*Br*4−*Br*3)/(*Bt*4−*Bt*3)=(10,518−6,008)/(10:00:20.000−10:00:10.000)=4,510/10=451   Expression (6)

By using the average of the calculated values, the accuracy of the numerical value increases, and the accuracy of packet delay measurement increases. In the case of the above-mentioned specific examples, the average counter value As of the first packet transfer delay measurement device 20 is 99, the average counter value Br of the second packet transfer delay measurement device 40 is 450.7, and the ratio x between the progress of the counters (average incremental ratio x=99:450.7) is calculated by the statistical data calculation unit 47 based on those average counter values. The statistical data calculation unit 47 records the ratio x between the progress of the counters (x=99:450.7) calculated based on the average counter values in a ratio storage table 463 (see FIG. 14).

By employing the above-mentioned procedure for the pre-measurement-start processing, the packet transfer delay can be handled even in the case where the first packet transfer delay measurement device 20 and the second packet transfer delay measurement device 40 use CPUs whose clocks have specifications different from each other.

In the above-mentioned procedure for the pre-measurement-start processing, the packets PP1, PP2, . . . , and PP*n* for the pre-measurement-start processing notification whose number corresponds to the number n of times of the repetition are transmitted from the first packet transfer delay measurement device 20 to the second packet transfer delay measurement device 40 by the control of the control unit 21 at random timings, but may be transmitted at predetermined periods.

[Post-Measurement-Start Processing]

Next, the post-measurement-start processing for the packet transfer delay is described with reference to FIG. 3, FIG. 4, and the related drawings. Note that, in the process of this processing, descriptions of the communication network existing between the first packet transfer delay measurement device 20 and the second packet transfer delay measurement device 40 and the subject device 10 subjected to the overload test are similarly omitted unless particular limitations are required.

In this case, the post-measurement-start processing for the packet transfer delay represents measuring the packet transfer delay by using the ratio (average incremental ratio) x between the progress of the counters calculated based on the average counter values in the above-mentioned pre-measurement-start processing.

Figure 8:
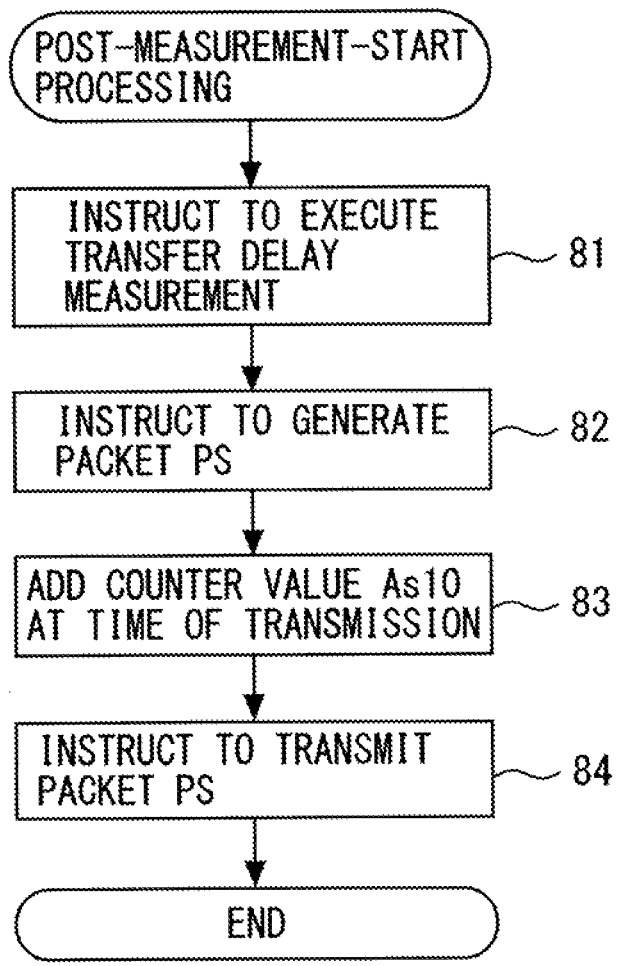
FIG. 8 is a flowchart illustrating post-measurement-start processing performed by the first packet transfer delay measurement device.

The control unit 21 of the first packet transfer delay measurement device 20 instructs the sequence processing unit 22 to execute the post-measurement-start processing, that is, packet transfer delay measurement, with the execution instruction issued by the operator of the operation terminal 60 as a trigger (Step 81 of FIG. 8). Note that, the execution instruction issued by the operator of the operation terminal 60 is issued to the first packet transfer delay measurement device 20, for example, after a notification of an end of the pre-measurement-start processing is received from the second packet transfer delay measurement device 40 by the operation terminal 60, not necessarily at the non-heavy traffic time.

The sequence processing unit 22 instructs the packet generation unit 24 to generate a packet in order to transmit a packet PS for the post-measurement-start processing notification to the second packet transfer delay measurement device 40 (Step 82).

The packet generation unit 24 acquires a counter value As (As=As10) indicated by the counter 231 associated with the device internal clock from the clock counting unit 23, and adds the counter value As to the packet PS (Step 83).

As illustrated as an example in FIG. 12, the packet PS for the post-measurement-start processing notification generated by the packet generation unit 24 is composed of the header part (IP header part) and the user data part succeeding thereto which contains the control code Cc (Cc=post-measurement-start processing notification) and the counter value As.

The sequence processing unit 22 instructs the packet transmission unit 25 to transmit the packet PS for the post-measurement-start processing notification (see FIG. 10) generated by the packet generation unit 24 to the second packet transfer delay measurement device 40 (Step 84).

Figure 9:
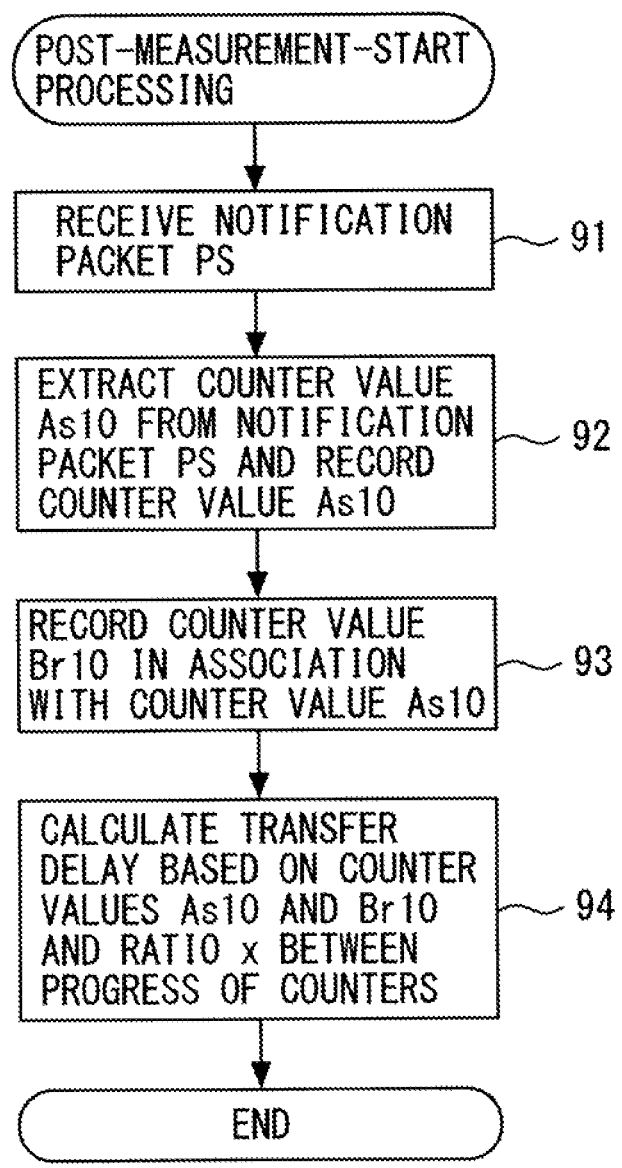
FIG. 9 is a flowchart illustrating post-measurement-start processing performed by the second packet transfer delay measurement device.

The second packet transfer delay measurement device 40 uses the packet reception unit 44 to receive the packet PS for the post-measurement-start processing notification transmitted from the first packet transfer delay measurement device 20 (Step 91 of FIG. 9).

The packet expansion unit 45 extracts the control code Cc (Cc=post-measurement-start processing notification) from the packet PS received by the packet reception unit 44, and notifies the control unit 41 thereof. Based on the notification, the control unit 41 causes the sequence processing unit 42 to execute the post-measurement-start processing.

In accordance with the instruction issued by the sequence processing unit 42, the packet expansion unit 45 extracts the counter value As10 from the received packet PS, and records the counter value As10 in the data storage unit 460 (Step 92).

At this time, the packet expansion unit 45 acquires the counter value Br (Br=Br10) indicated by the counter 431 associated with the device internal clock from the clock counting unit 43, and records the acquired counter value (at the time of the reception of the packet PS) Br10 in a table 462 for the post-measurement-start processing of the data storage unit 460 (see FIG. 15) in association with the counter value (at the time of the transmission of the packet PS) As10 (Step 93).

Figure 10:
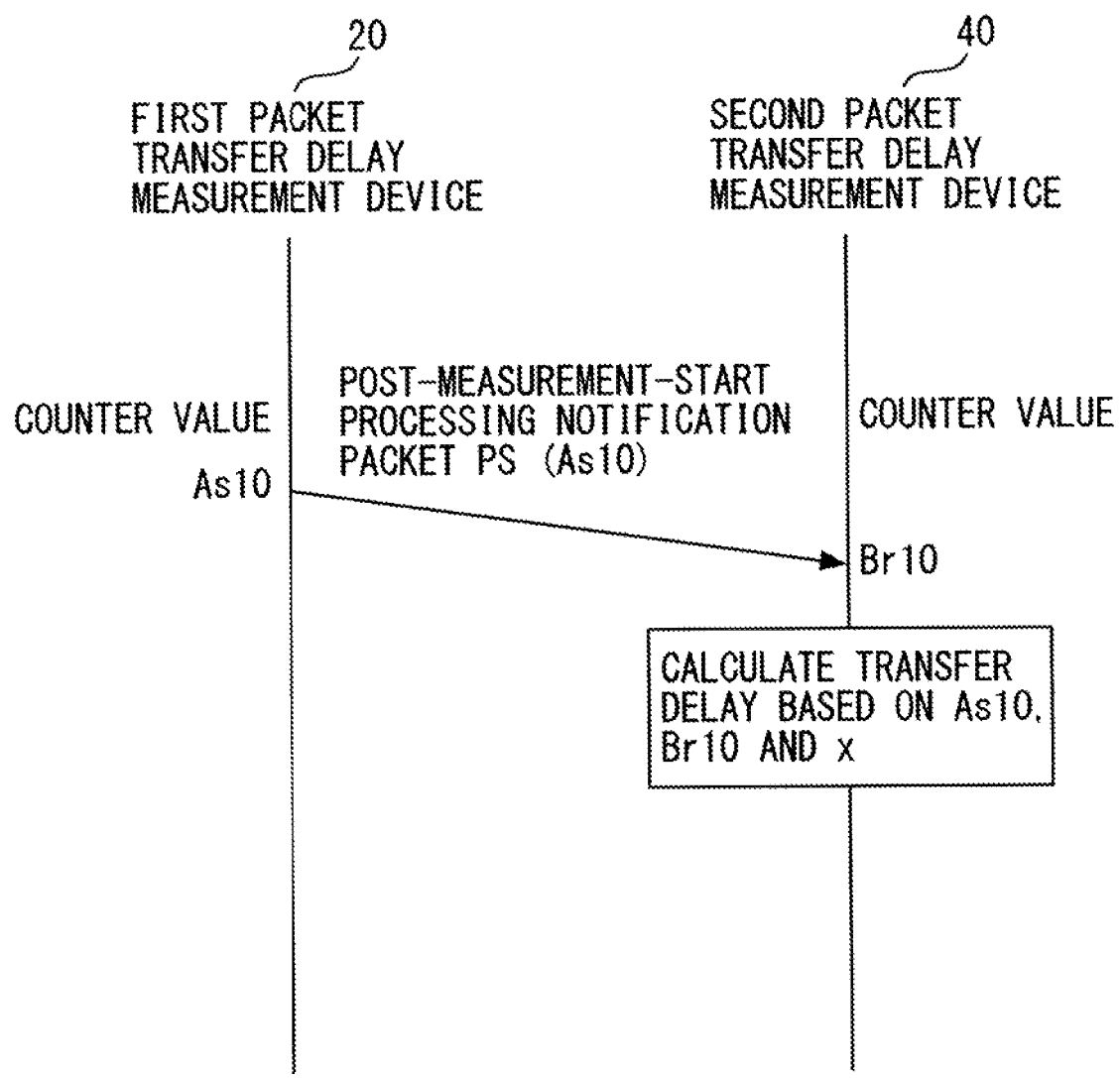
FIG. 10 is a sequence chart of the post-measurement-start processing.

As a result of the post-measurement-start processing corresponding to the above-mentioned Steps 81, 82, 83, and 84 and Steps 91, 92, and 93, the packet PS for the post-measurement-start processing notification is transmitted/received between the first packet transfer delay measurement device 20 and the second packet transfer delay measurement device 40 (see FIG. 10).

The delay measurement unit 48 of the second packet transfer delay measurement device 40 refers to the counter value As10 and the counter value Br10 each recorded in the table 462 for the post-measurement-start processing of the data storage unit 460 to calculate a counter value (expected counter value) Brx supposed at the time of the reception based on the counter value As10 and the ratio x between the progress of the counters recorded in the ratio storage table 463 (see FIG. 14) of the data storage unit 460. Then, the delay measurement unit 48 obtains the one-way packet transfer delay by comparing the expected counter value Brx being a result of the calculation and the actual counter value Br10 at the time of the reception (Step 94).

Next, a description is made of the calculation of the packet transfer delay by taking specific values acquired respectively in the first packet transfer delay measurement device 20 and the second packet transfer delay measurement device 40 as examples.

As exemplified in FIG. 15, in the table 462 for the post-measurement-start processing, the counter value (at the time of the transmission) As of the first packet transfer delay measurement device 20 and the counter value (at the time of the reception) Br of the second packet transfer delay measurement device 40 are recorded in association with each other.

In this case, the description is made by using the values acquired and calculated in the above-mentioned pre-measurement-start processing as they are. In the case of the above-mentioned specific example of the pre-measurement-start processing, the average counter value As of the first packet transfer delay measurement device 20 is 99, the average counter value Br of the second packet transfer delay measurement device 40 is 450.7, and based on those average values, the ratio x between the progress of the counters (average incremental ratio x=99:450.7) has already been calculated by the statistical data calculation unit 47.

The delay measurement unit 48 calculates the expected counter value Brx within the second packet transfer delay measurement device 40 based on the counter value As (As=As10) within the table 462 for the post-measurement-start processing and the ratio x between the progress of the counters within the ratio storage table 463 by using Expression (7).

$$Brx=(450.7/99) \times As10=(450.7/99) \times 1,333=6,068.5 \quad \text{Expression (7)}$$

The delay measurement unit 48 calculates a delay corresponding to count of 86.5 which has occurred during the transfer, based on the calculated expected counter value Brx (Brx=6,068.5) at the time of the reception and an actual counter value Br (Br10=6,155) at the time of the reception, and notifies the control unit 41 thereof. The control unit 41 transmits the notification content received from the delay measurement unit 48 to the operation terminal 60.

As described above, in the packet transfer delay measurement system 1 according to the first embodiment, with the use of the average incremental ratio x corresponding to the ratio between the average of a difference of the counter value As per unit time and the average of a difference of the counter value Br per unit time as a reference value, the one-way packet transfer delay can be measured as the counter value in a time-asynchronous manner.

Then, based on the measured one-way packet transfer delay (counter value), it is possible to estimate the time for the packet transfer delay to be caused when an overload is imposed on the subject device 10 subjected to the overload test existing between the first packet transfer delay measurement device 20 and the second packet transfer delay measurement device 40.

As a result, it is possible to present a quality index that allows a company providing services by using the communication network to determine whether or not a communication network system can endure a specific service, and by extension, the end user can enjoy a network service that can be used with stability.

[Effects]

According to the packet transfer delay measurement system 1 of the above-mentioned first embodiment, with the use of the incremental ratio between the counter value obtained by the first counter at the time of the transmission and the counter value obtained by the second counter at the time of the reception as a reference value, the one-way packet transfer delay between the first packet transfer delay measurement device 20 and the second packet transfer delay measurement device 40 can be measured as a counter value in a time-asynchronous manner.

[Second Embodiment]

A packet transfer delay measurement system 1 according to a second embodiment of the present invention employs the configuration illustrated in FIG. 3 in the same manner as in the first embodiment. Therefore, also in the packet transfer delay measurement system 1 according to the second embodiment, the first packet transfer delay measurement device 20 and the second packet transfer delay measurement device 40 are disposed so as to be opposed to each other with respect to the subject device 10 subjected to the overload test which exists in the communication network.

In the second embodiment described below in detail, a transfer counter value between the first packet transfer delay measurement device 20 and the second packet transfer delay measurement device 40 is further calculated in the pre-measurement-start processing, and the one-way packet transfer delay obtained in the post-measurement-start processing is corrected based on the transfer counter value to calculate a relative one-way packet transfer delay. Note that, the same matters as those of the above-mentioned first embodiment are omitted unless ambiguity is induced.

[Packet Transfer Delay Measurement Device]

Figure 16:
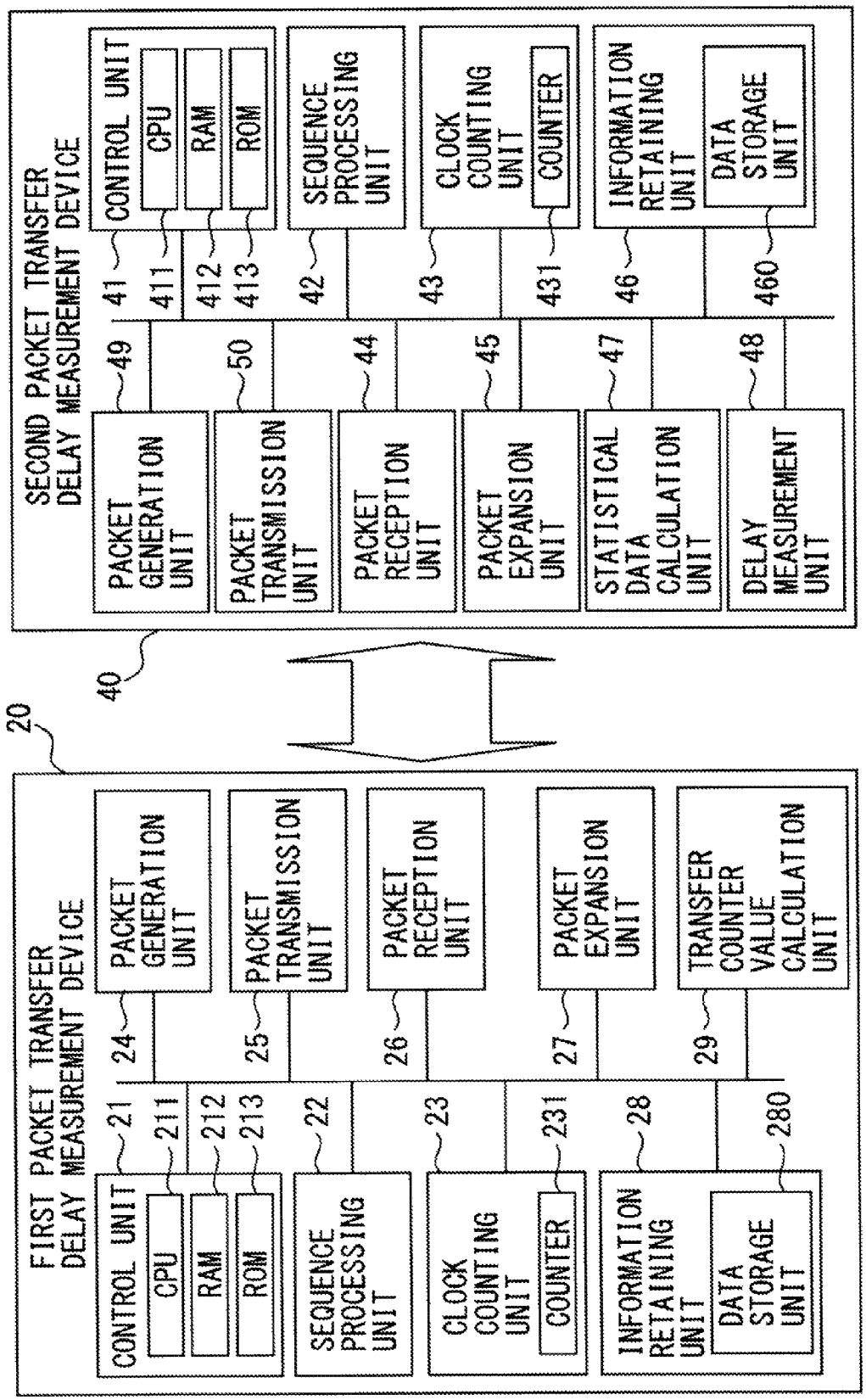
FIG. 16 is a block diagram illustrating configurations of a first packet transfer delay measurement device and a second packet transfer delay measurement device according to the second embodiment of the present invention.

FIG. 16 illustrates an example of detailed configurations of a first packet transfer delay measurement device 20 and a second packet transfer delay measurement device 40 applied to the packet transfer delay measurement system 1 according to the second embodiment illustrated in FIG. 3.

In the second embodiment, the first packet transfer delay measurement device 20 disposed on the input path side toward the subject device 10 is, for example, an information processing device having a packet communication function, and includes a control unit 21, a sequence processing unit 22, a clock counting unit 23, a packet generation unit 24, a packet transmission unit 25, and an information retaining unit 28. In addition, the first packet transfer delay measurement device 20 further includes a packet reception unit 26, a packet expansion unit 27, and a transfer counter value calculation unit 29. Those components can be implemented by a dedicated individual circuit, an arithmetic processing circuit, or the like.

Further, the second packet transfer delay measurement device 40 disposed on the output path side from the subject device 10 is, for example, an information processing device having a packet communication function, and includes a control unit 41, a sequence processing unit 42, a clock counting unit 43, a packet reception unit 44, a packet expansion unit 45, an information retaining unit 46, a statistical data calculation unit 47, and a delay measurement unit 48. In addition, the second packet transfer delay measurement device 40 further includes a packet generation unit 49 and a packet transmission unit 50. In the same manner, those components can be implemented by a dedicated individual circuit, an arithmetic processing circuit, or the like.

To describe outlines of the components added in the second embodiment, the packet reception unit 26 receives the packet (response packet) transmitted (returned) from the opposed second packet transfer delay measurement device 40 via the subject device 10 subjected to the overload test. The packet expansion unit 27 decomposes the received packet, and expands (records) necessary contents on a data storage unit 280. The data storage unit 280 includes a table described later.

The transfer counter value calculation unit 29 calculates the transfer counter value between the first packet transfer delay measurement device 20 and the second packet transfer delay measurement device 40 in the pre-measurement-start processing.

The packet generation unit 49 generates (composes) the packet (response packet) to be transmitted to the opposed first packet transfer delay measurement device 20. The packet transmission unit 50 transmits the generated packet to the opposed first packet transfer delay measurement device 20 via the subject device 10 subjected to the overload test.

To logically realize the pre-measurement-start processing and the post-measurement-start processing that are described later in detail, in the first packet transfer delay measurement device 20 and the second packet transfer delay measurement device 40, a control program is installed in the information retaining units 28 and 46 as the application program so that the CPUs 211 and 411 expand the control program in the RAMs 212 and 412, respectively, to execute the control program with the execution instruction issued by the operator of the operation terminal 60 as a trigger.

[Pre-Measurement-Start Processing]

Next, the pre-measurement-start processing for the packet transfer delay is described with reference to FIG. 16 and the related drawings.

In the processing performed before starting the measurement of the packet transfer delay, a transfer counter value Ac between the first packet transfer delay measurement device 20 and the second packet transfer delay measurement device 40, and a ratio x between the progress of the counters within the first packet transfer delay measurement device 20 and the second packet transfer delay measurement device 40, that is, a ratio (incremental ratio) x between the counter values (count values) indicated by the counters 231 and 431, are respectively calculated at the non-heavy traffic time (including no-load time) of the subject device 10 subjected to the overload test.

Figure 17:
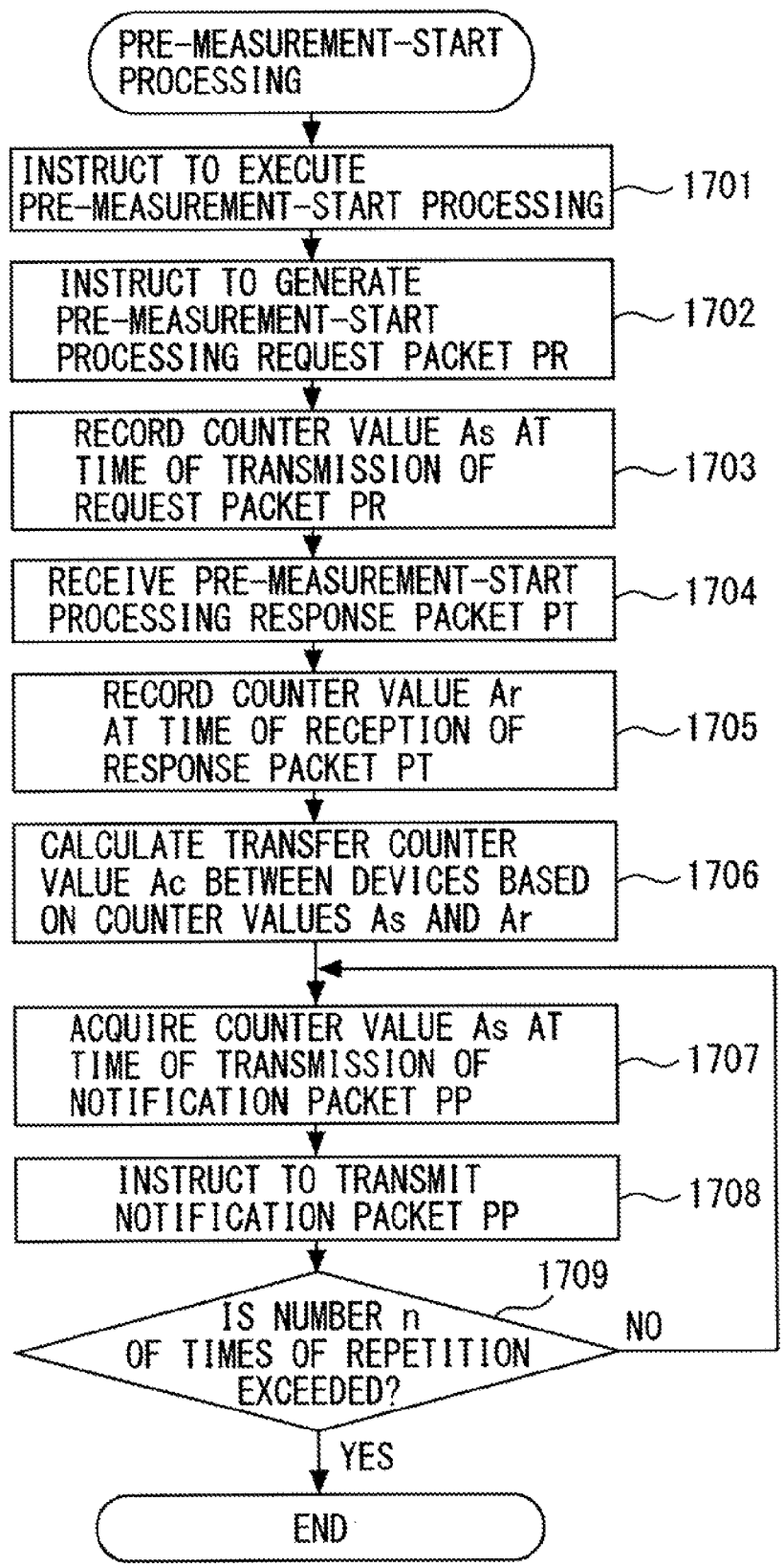
FIG. 17 is a flowchart illustrating the pre-measurement-start processing performed by the first packet transfer delay measurement device.

The control unit 21 of the first packet transfer delay measurement device 20 instructs the sequence processing unit 22 to execute the pre-measurement-start processing with the execution instruction issued by the operator through the operation terminal 60 as a trigger (Step 1701 of FIG. 17). At this time, the sequence processing unit 22 is also notified of a number n of times of repetition of the pre-measurement-start processing designated by the operator.

The sequence processing unit 22 instructs the packet generation unit 24 to generate a packet in order to transmit a packet (sometimes also referred to simply as "request packet") PR for a pre-measurement-start processing request to the second packet transfer delay measurement device 40 (Step 52). The packet generation unit 24 acquires the number n of times of repetition from the sequence processing unit 22 and adds the acquired number n to the request packet PR (Step 1702).

As illustrated as an example in FIG. 23, the packet PR for the pre-measurement-start processing request generated by the packet generation unit 24 is composed of a header part and a user data part succeeding thereto which contains a control code Cc (Cc=pre-measurement-start processing request) and the number n of times of the repetition.

The sequence processing unit 22 acquires the counter value indicated by the counter 231 associated with the device internal clock from the clock counting unit 23 as the counter value As at the time of the transmission of the request packet PR, records (stores) the counter value in a transfer counter value table 281 of the data storage unit 280, and then instructs the packet transmission unit 25 to transmit the request packet PR generated by the packet generation unit 24 to the second packet transfer delay measurement device 40 (Step 1703).

Figure 18:
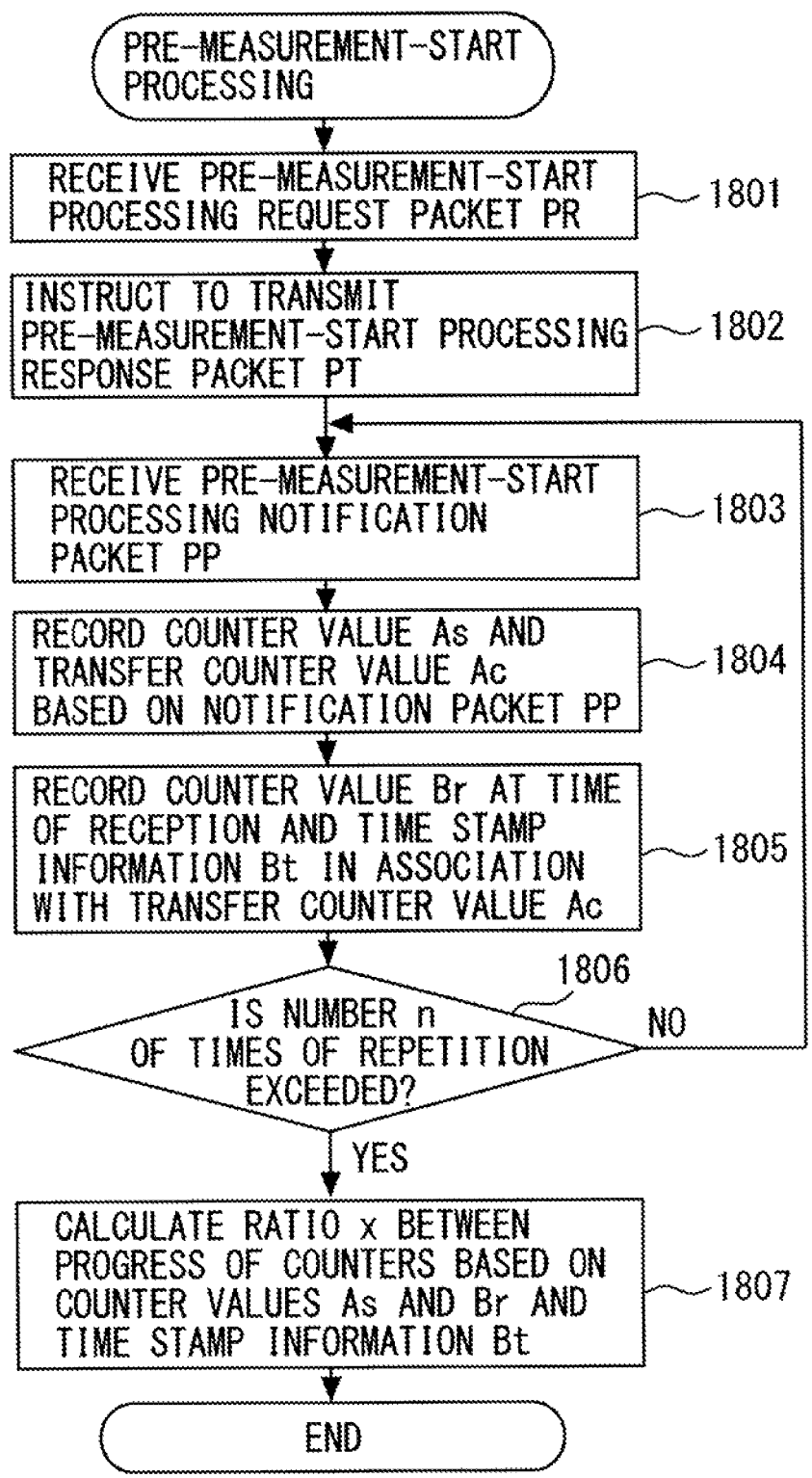
FIG. 18 is a flowchart illustrating the pre-measurement-start processing performed by the second packet transfer delay measurement device.
Figure 19:
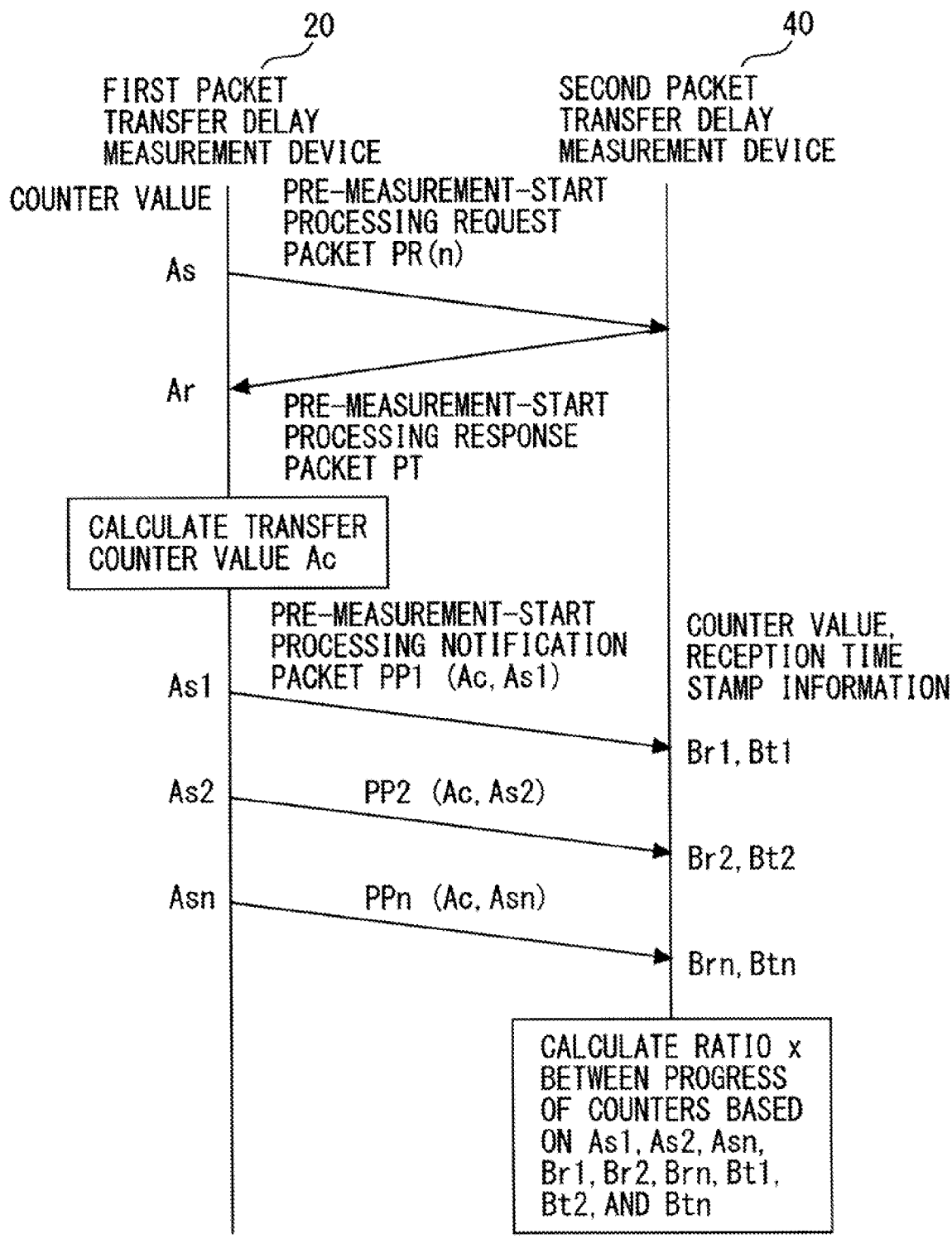
FIG. 19 is a sequence chart of the pre-measurement-start processing.

The second packet transfer delay measurement device 40 booted with the execution instruction issued by the operator of the operation terminal 60 as a trigger uses the packet reception unit 44 to receive the packet PR (see FIG. 19) for a pre-measurement-start processing request transmitted from the first packet transfer delay measurement device 20 (Step 1801 of FIG. 18).

The packet expansion unit 45 extracts the control code Cc (Cc=pre-measurement-start processing request) from the request packet PR received by the packet reception unit 44, and notifies the control unit 41 of the control code Cc. Based on the notification, the control unit 41 causes the sequence processing unit 42 to execute the pre-measurement-start processing (request).

In accordance with the instruction issued by the sequence processing unit 42, the packet expansion unit 45 extracts the number n of times of the repetition from the received request packet PR, and records the number n in the data storage unit 460.

The sequence processing unit 42 instructs the packet generation unit 49 to generate a packet in order to transmit a packet (sometimes also referred to simply as "response packet") PT for a pre-measurement-start processing response to the first packet transfer delay measurement device 20. The packet generation unit 49 acquires a result of acknowledgment/negative-acknowledgment determination from the sequence processing unit 42, and adds the result to the response packet PT.

As illustrated as an example in FIG. 24, the packet PT for the pre-measurement-start processing response generated by the packet generation unit 49 is composed of a header part and a user data part succeeding thereto which contains a control code Cc (Cc=pre-measurement-start processing response), and acknowledgment/negative-acknowledgment information (ACK/NACK).

The sequence processing unit 42 instructs the packet transmission unit 50 to transmit the response packet PT generated by the packet generation unit 49 to the first packet transfer delay measurement device 20 (Step 1802).

The first packet transfer delay measurement device 20 uses the packet reception unit 26 to receive the response packet PT (see FIG. 19) transmitted from the second packet transfer delay measurement device 40 (Step 1704).

The packet expansion unit 27 extracts the control code Cc (Cc=pre-measurement-start processing the response) from the response packet PT received by the packet reception unit 26, and notifies the control unit 21 thereof. Further, the packet expansion unit 27 acquires the acknowledgment/negative-acknowledgment information from the received response packet PT, and records the acknowledgment/negative-acknowledgment information in the data storage unit 280. Based on the notification received from the packet expansion unit 27, the control unit 21 causes the sequence processing unit 22 to execute the pre-measurement-start processing (response).

The sequence processing unit 22 refers to the acknowledgment/negative-acknowledgment information within the data storage unit 280. When the acknowledgment/negative-acknowledgment information is "acknowledgment (ACK)", the sequence processing unit 22 acquires the counter value indicated by the counter 231 associated with the device internal clock from the clock counting unit 23 as a counter value Ar at the time of the reception of the response packet PT, and records the counter value in the transfer counter value table 281 of the data storage unit 280 (Step 1705). Note that, when the acknowledgment/negative-acknowledgment information is "negative-acknowledgment (NACK)", the sequence processing unit 22 notifies the control unit 21 of the end of the execution of the pre-measurement-start processing (response).

The transfer counter value calculation unit 29 calculates a transfer counter value Ac between the first packet transfer delay measurement device 20 and the second packet transfer delay measurement device 40 based on the counter value As at the time of the transmission of the request packet PR and the counter value Ar at the time of the reception of the response packet PT that are recorded in association with each other in the transfer counter value table 281 (Step 1706).

At the non-heavy traffic time of the subject device 10 subjected to the overload test, when the packet is transmitted/received between the first packet transfer delay measurement device 20 and the second packet transfer delay measurement device 40 via the subject device 10, there is little difference between the transfer time for an approaching route and the transfer time for a returning route. Therefore, an intermediate value of a difference between the counter value As at the time of the transmission of the request packet PR and the counter value Ar at the time of the reception of the response packet PT within the first packet transfer delay measurement device 20 can be assumed as the transfer counter value Ac between the first packet transfer delay measurement device 20 and the second packet transfer delay measurement device 40. As a result, the transfer counter value Ac is obtained as Ac=(Ar−As)/2.

The transfer counter value Ac calculated in this case is the relative one-way packet transfer delay between the first packet transfer delay measurement device 20 and the second packet transfer delay measurement device 40.

When the transfer counter value calculation unit 29 finishes calculating the transfer counter value Ac between the first packet transfer delay measurement device 20 and the second packet transfer delay measurement device 40, the control unit 21 of the first packet transfer delay measurement device 20 executes processing for obtaining the ratio x between the progress of the counters within the first packet transfer delay measurement device 20 and the second packet transfer delay measurement device 40.

The sequence processing unit 22 instructs the packet generation unit 24 to generate a packet in order to transmit a packet (sometimes also referred to simply as "notification packet") PP for the pre-measurement-start processing notification to the second packet transfer delay measurement device 40.

The packet generation unit 24 acquires the transfer counter value Ac from the transfer counter value table 281, while acquiring the counter value As (As=As1) at the time of the transmission of the notification packet PP from the clock counting unit 23, and adds the transfer counter value Ac and the counter value As to the notification packet PP (Step 1707).

As illustrated as an example in FIG. 25, the packet PP for the pre-measurement-start processing notification generated by the packet generation unit 24 is composed of a header part and a user data part succeeding thereto which contains a control code Cc (Cc=pre-measurement-start processing notification), the transfer counter value Ac, and the counter value As.

The sequence processing unit 22 instructs the packet transmission unit 25 to transmit the packet PP (PP1 of FIG. 19) for the pre-measurement-start processing notification generated by the packet generation unit 24 to the second packet transfer delay measurement device 40 (Step 1708).

The second packet transfer delay measurement device 40 uses the packet reception unit 44 to receive the packet PP (PP=PP1) for the pre-measurement-start processing notification transmitted from the first packet transfer delay measurement device 20 (Step 1803).

The packet expansion unit 45 extracts the control code Cc (Cc=pre-measurement-start processing notification) from the packet received by the packet reception unit 44, and notifies the control unit 41 thereof. Based on the notification, the control unit 41 causes the sequence processing unit 42 to execute the pre-measurement-start processing (notification).

In accordance with an instruction issued by the sequence processing unit 42, the packet expansion unit 45 extracts the transfer counter value Ac and the counter value As1 from the received notification packet PP1, and records the transfer counter value Ac and the counter value As1 in the data storage unit 460 (Step 62).

At this time, the packet expansion unit 45 records the transfer counter value Ac extracted from the notification packet PP1 in a transfer counter value table 464 (see FIG. 28) of the data storage unit 460 (Step 1804).

At this time, the packet expansion unit 45 acquires a counter value Br (Br=Br1) indicated by the counter 431 associated with the device internal clock from the clock counting unit 43, and records the acquired counter value (at a time of reception of the packet PP1) Br1 in a table 461 for the pre-measurement-start processing of the data storage unit 460 (see FIG. 13) in association with the counter value (at a time of transmission of the packet PP1) As1 (Step 1805).

Further, the packet expansion unit 45 acquires time stamp information Bt (Bt=Bt1) at the time of the reception of the packet PP1 from the control unit 41, and records the acquired time stamp information Bt1 in the table 461 for the pre-measurement-start processing in association with the counter value As1 and the counter value Br1 (Step 1805).

The pre-measurement-start processing corresponding to the above-mentioned Steps 1707 and 1708, and Steps 1803, 1804, and 1805 is repeated the designated number n of times of the repetition (Steps 1709 and 1806). As a result, the packets PP1, PP2, . . . , and PPn for the pre-measurement-start processing notification are transmitted/received between the first packet transfer delay measurement device 20 and the second packet transfer delay measurement device 40 (see FIG. 19).

The statistical data calculation unit 47 of the second packet transfer delay measurement device 40 calculates the ratio x between the progress of the counters within the first packet transfer delay measurement device 20 and the second packet transfer delay measurement device 40 based on the counter values As1, As2, . . . , and Asn, the counter values Br1, Br2, . . . , and Brn, and the pieces of time stamp information Bt1, Bt2, . . . , and Btn which are recorded in the table 461 for the pre-measurement-start processing of the data storage unit 460 (Step 1807).

Note that, a specific example of the calculation of the ratio x between the progress of the counters is the same as in the above-mentioned first embodiment. Therefore, the average counter value As of the first packet transfer delay measurement device 20 is 99, the average counter value Br of the second packet transfer delay measurement device 40 is 450.7, and based on those average counter values, the ratio x between the progress of the counters (average incremental ratio x=99:450.7) is calculated by the statistical data calculation unit 47. The statistical data calculation unit 47 records the ratio x between the progress of the counters (x=99:450.7) calculated based on the average counter values in the ratio storage table 463 (see FIG. 14).

[Post-Measurement-Start Processing]

Next, the post-measurement-start processing for the packet transfer delay is described with reference to FIG. 16 and the related drawings.

In this case, the post-measurement-start processing for the packet transfer delay represents measuring the packet transfer delay by using both the transfer counter value Ac and the ratio x between the progress of the counters calculated based on the average counter values in the above-mentioned pre-measurement-start processing.

The control unit 21 of the first packet transfer delay measurement device 20 instructs the sequence processing unit 22 to execute the post-measurement-start processing, that is, packet transfer delay measurement, with the execution instruction issued by the operator of the operation terminal 60 as a trigger. Note that, the execution instruction issued by the operator of the operation terminal 60 is issued to the first packet transfer delay measurement device 20, for example, after a notification of an end of the pre-measurement-start processing is received from the second packet transfer delay measurement device 40 by the operation terminal 60, not necessarily at the non-heavy traffic time.

The sequence processing unit 22 instructs the packet generation unit 24 to generate a packet in order to transmit a packet PS for the post-measurement-start processing notification to the second packet transfer delay measurement device 40.

Figure 20:
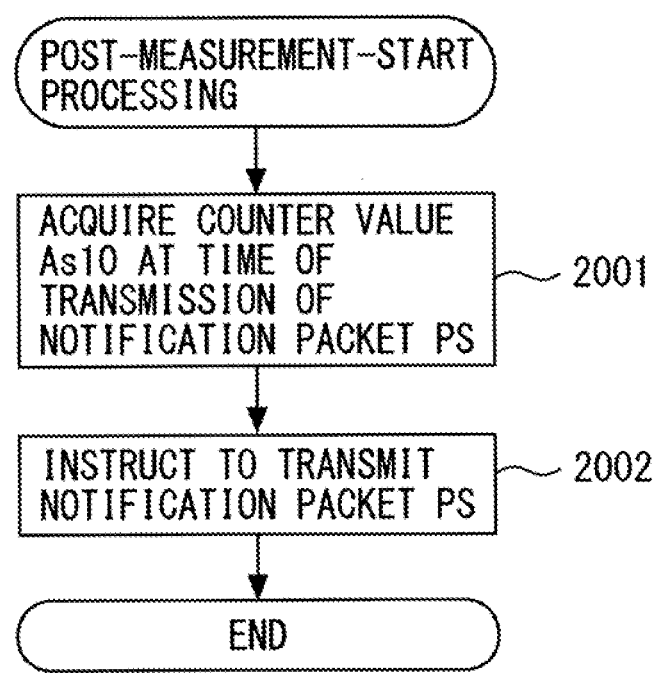
FIG. 20 is a flowchart illustrating the post-measurement-start processing performed by the first packet transfer delay measurement device.

The packet generation unit 24 acquires the counter value indicated by the counter 231 associated with the device internal clock from the clock counting unit 23 as the counter value As10 at the time of the transmission of the notification packet PS, and adds the counter value to the notification packet PS (Step 2001 of FIG. 20).

As illustrated as an example in FIG. 26, the packet PS for the post-measurement-start processing notification generated by the packet generation unit 24 is composed of the header part and the user data part succeeding thereto which contains the control code Cc (Cc=post-measurement-start processing notification) and the counter value As.

The sequence processing unit 22 instructs the packet transmission unit 25 to transmit the packet PS for the post-measurement-start processing notification generated by the packet generation unit 24 to the second packet transfer delay measurement device 40 (Step 2002).

Figure 21:
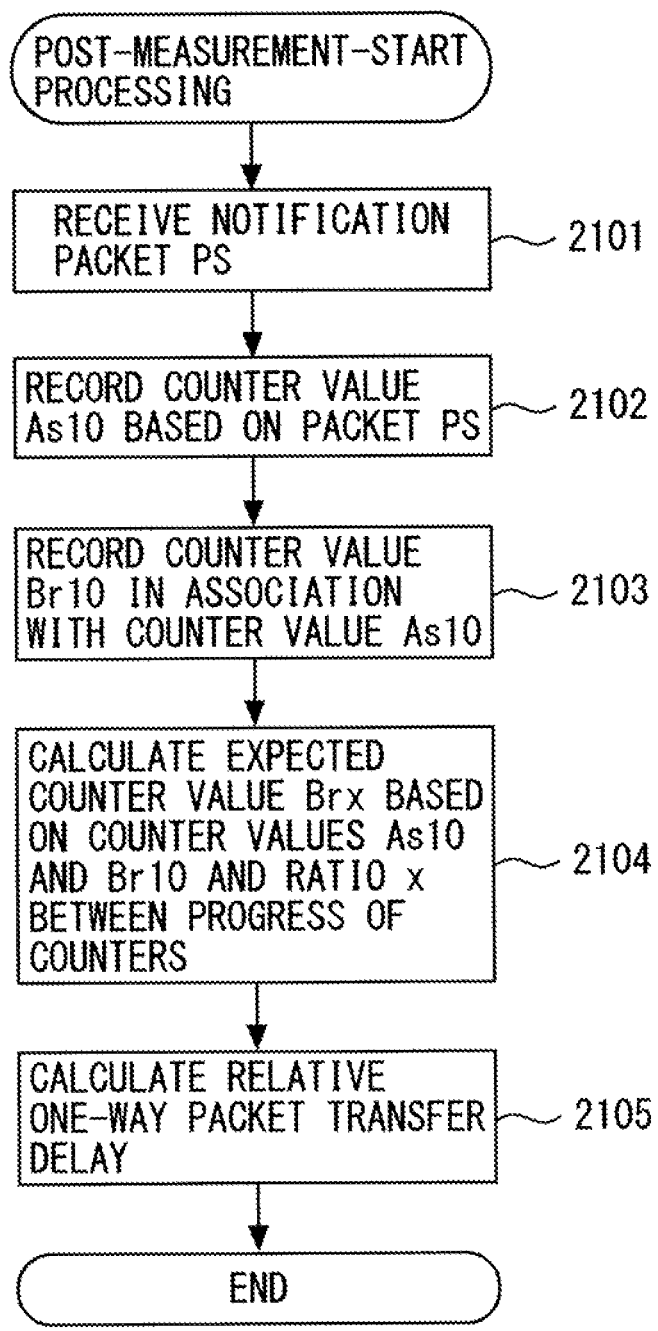
FIG. 21 is a flowchart illustrating the post-measurement-start processing performed by the second packet transfer delay measurement device.

The second packet transfer delay measurement device 40 uses the packet reception unit 44 to receive the packet PS (see FIG. 22) for the post-measurement-start processing notification transmitted from the first packet transfer delay measurement device 20 (Step 2101 of FIG. 21).

The packet expansion unit 45 extracts the control code Cc (Cc=post-measurement-start processing notification) from the notification packet PS received by the packet reception unit 44, and notifies the control unit 41 thereof. Based on the notification, the control unit 41 causes the sequence processing unit 42 to execute the post-measurement-start processing.

In accordance with the instruction issued by the sequence processing unit 42, the packet expansion unit 45 extracts the counter value As10 from the received notification packet PS, and records the counter value As10 in the data storage unit 460 (Step 2102).

At this time, the packet expansion unit 45 acquires the counter value Br (Br=Br10) indicated by the counter 431 associated with the device internal clock from the clock counting unit 43, and records the acquired counter value (at the time of the reception of the packet PS) Br10 in a table 462 for the post-measurement-start processing of the data storage unit 460 (see FIG. 15) in association with the counter value (at the time of the transmission of the packet PS) As10 (Step 2103).

Figure 22:
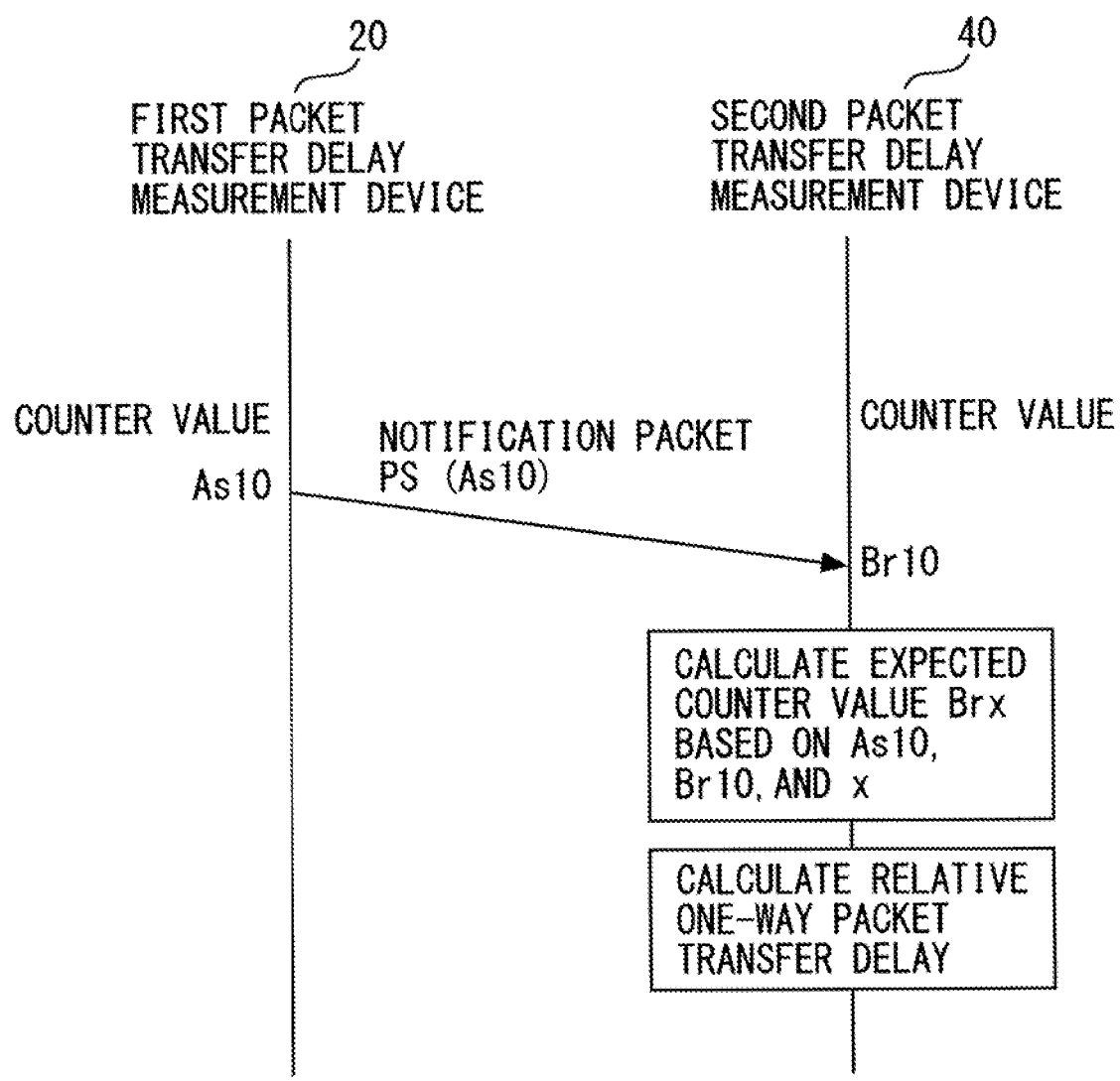
FIG. 22 is a sequence chart of the post-measurement-start processing.

As a result of the post-measurement-start processing corresponding to the above-mentioned Steps 2001 and 2002, and Steps 2101, 2102, and 2103, the packet PS for the post-measurement-start processing notification is transmitted/received between the first packet transfer delay measurement device 20 and the second packet transfer delay measurement device 40 (see FIG. 22).

The delay measurement unit 48 of the second packet transfer delay measurement device 40 refers to the counter value As10 and the counter value Br10 recorded respectively in the table 462 for the post-measurement-start processing of the data storage unit 460 to calculate the expected counter value Brx at the time of the reception based on the counter value As10 and the ratio (average incremental ratio) x between the progress of the counters recorded in the ratio storage table 463 (see FIG. 14) of the data storage unit 460 (Step 2104).

In addition, the delay measurement unit 48 obtains a one-way packet transfer delay Brz by comparing the expected counter value Brx obtained as a result of the calculation with the actual counter value Br10 at the time of the reception. The delay measurement unit 48 corrects the obtained one-way packet transfer delay Brz based on the transfer counter value Ac recorded in the transfer counter value table 464, and calculates the relative one-way packet transfer delay (Step 2105).

To describe the specific example of the calculation, the delay measurement unit 48 calculates the expected counter value Brx within the second packet transfer delay measurement device 40 by using the above-mentioned Expression (7) based on the counter value As (As10=1,333) within the table 462 for the post-measurement-start processing and the ratio x between the progress of the counters (average incremental ratio x=99:450.7) within the ratio storage table 463.

$$Brx = (450.7/99) \times As10 = (450.7/99) \times 1,333 = 6,068.5$$

The delay measurement unit 48 obtains the delay corresponding to count of 86.5 which has occurred as the packet transfer delay Brz during the transfer, based on the calculated expected counter value Brx (Brx=6,068.5) at the time of the reception and the actual counter value Br (Br10=6,155) at the time of the reception.

The delay measurement unit 48 corrects the obtained one-way packet transfer delay Brz (Brz=86.5) by using Expression (8) based on the transfer counter value Ac, for example, Ac=(Ar−As)/2=(200−100)/2=50.

$$Brz + Ac = 86.5 + 50 = 136.5 \qquad \text{Expression (8)}$$

The delay measurement unit 48 notifies the control unit 41 of the one-way packet transfer delay Brz that has been corrected.

The control unit 41 transmits the notification content received from the delay measurement unit 48 to the operation terminal 60.

In the packet transfer delay measurement system 1 according to the above-mentioned second embodiment, the same effect as in the packet transfer delay measurement system 1 according to the first embodiment can be expected.

[Modified Example]

The processing according to each of the above-mentioned embodiments is provided as a computer-executable program, and can be provided in the form of a recording medium such as a CD-ROM or a flexible disk or through the intermediation of a communication line.

What is claimed is:

1. A packet transfer delay measurement system, comprising a first measurement device and a second measurement device that are opposed to each other via a communication device existing in a network, for measuring a one-way packet transfer delay between the first measurement device and the second measurement device in a time-asynchronous manner, the first measurement device including:

a unit that generates, at a non-heavy traffic time of the communication device, a predetermined number of first packets each containing a first counter value at a time of transmission obtained by a first counter associated with a first internal clock and transmits the first packets; and a unit that generates a second packet containing a second counter value at the time of the transmission obtained by the first counter with an instruction issued from an external portion as a trigger after the transmission of the first packets and transmits the second packet;

the second measurement device including:
a unit that sequentially stores, when each of the first packets transmitted from the first measurement device is received via the communication device, the first counter value extracted from each of the first packets, a third counter value at a time of reception obtained by a second counter associated with a second internal clock, and reception time stamp information in storage unit in association with one another;

a unit that calculates an incremental ratio between the first counter value and the third counter value per unit time based on the first counter value, the third counter value, and the reception time stamp information that are stored respectively in the storage unit; and a unit that calculates, when the second packet transmitted from the first measurement device is received via the communication device, an expected fourth counter value at the time of the reception based on the second counter value extracted from the second packet and the incremental ratio, and obtains the one-way packet transfer delay based on the calculated expected fourth counter value and an actual fourth counter value at the time of the reception.

2. The packet transfer delay measurement system according to claim 1, wherein:
the second measurement device further includes:
a unit that stores, when the second packet transmitted from the first measurement device is received via the communication device, the second counter value extracted from the second packet and the actual fourth counter value at the time of the reception obtained by the second counter in the storage unit in association with each other.

3. The packet transfer delay measurement system according to claim 1, wherein the incremental ratio is a ratio between a difference of the first counter value per unit time and a difference of the third counter value per unit time.

4. The packet transfer delay measurement system according to claim 1, wherein the incremental ratio is an average incremental ratio corresponding to a ratio between an average of a difference of the first counter value per unit time and an average of a difference of the third counter value per unit time.

5. The packet transfer delay measurement system according to claim 1, wherein the first internal clock and the second internal clock have specifications different from each other.

6. The packet transfer delay measurement system according to claim 1, wherein:
the first measurement device further includes:
a unit that transmits/receives a predetermined packet to/from the second measurement device before transmitting the first packets, and calculates an intermediate value of a difference between a counter value at a time of transmission obtained by the first counter and a counter value at a time of reception obtained by the first counter as a transfer counter value between the first measurement device and the second measurement device; and a unit that generates the predetermined number of first packets each containing the calculated transfer counter value along with the first counter value and transmits the first packets;

the second measurement device further includes:
a unit that calculates, when the second packet transmitted from the first measurement device is received via the communication device, the expected fourth counter value at the time of the reception based on the second counter value extracted from the second packet and the incremental ratio, obtains the one-way packet transfer delay by comparing the calculated expected fourth counter value with the actual fourth counter value at the time of the reception, and corrects the obtained one-way packet transfer delay based on the transfer counter value extracted from the first packets.

7. A packet transfer delay measurement method of measuring a one-way packet transfer delay between a first measurement device and a second measurement device that are opposed to each other via a communication device existing in a network in a time-asynchronous manner, the packet transfer delay measurement method comprising:
generating, by the first measurement device, at a non-heavy traffic time of the communication device, a predetermined number of first packets each containing a first counter value at a time of transmission obtained by a first counter associated with a first internal clock and transmitting the first packets; and generating, by the first measurement device, a second packet containing a second counter value at the time of the transmission obtained by the first counter with an instruction issued from an external portion as a trigger after the transmission of the first packets and transmitting the second packet;

sequentially storing, by the second measurement device, when each of the first packets transmitted from the first measurement device is received via the communication device, the first counter value extracted from each of the first packets, a third counter value at a time of reception obtained by a second counter associated with a second internal clock, and reception time stamp information in storage unit in association with one another;

calculating, by the second measurement device, an incremental ratio between the first counter value and the third counter value per unit time based on the first counter value, the third counter value, and the reception time stamp information that are stored respectively in the storage unit; and calculating, by the second measurement device, when the second packet transmitted from the first measurement device is received via the communication device, an expected fourth counter value at the time of the reception based on the second counter value extracted from the second packet and the incremental ratio, and obtaining the one-way packet transfer delay based on the calculated expected fourth counter value and an actual fourth counter value at the time of the reception.

8. The packet transfer delay measurement method according to claim 7, further comprising:
transmitting/receiving, by the first measurement device, a predetermined packet to/from the second measurement device before transmitting the first packets, and calculating an intermediate value of a difference between a counter value at a time of transmission obtained by the first counter and a counter value at a time of reception obtained by the first counter as a transfer counter value between the first measurement device and the second measurement device;

generating, by the first measurement device, the predetermined number of first packets each containing the calculated transfer counter value along with the first counter value and transmitting the first packets; and calculating, by the second measurement device, when the second packet transmitted from the first measurement device is received via the communication device, the expected fourth counter value at the time of the reception based on the second counter value extracted from the second packet and the incremental ratio, obtaining the one-way packet transfer delay by comparing the calculated expected fourth counter value with the actual fourth counter value at the time of the reception, and correcting the obtained one-way packet transfer delay based on the transfer counter value extracted from the first packets.

* * * * *